US012409538B2

(12) United States Patent
Pelletier et al.

(10) Patent No.: US 12,409,538 B2
(45) Date of Patent: Sep. 9, 2025

(54) HAMMER TACKER

(71) Applicant: STANLEY BLACK & DECKER, INC., New Britain, CT (US)

(72) Inventors: Thomas Pelletier, Wallingford, CT (US); Kun-Ta Wu, Taichung (TW)

(73) Assignee: STANLEY BLACK & DECKER, INC., New Britain, CT (US)

( * ) Notice: Subject to any disclaimer, the term of this patent is extended or adjusted under 35 U.S.C. 154(b) by 0 days.

(21) Appl. No.: 18/453,499

(22) Filed: Aug. 22, 2023

(65) Prior Publication Data

US 2023/0390908 A1 Dec. 7, 2023

Related U.S. Application Data

(60) Continuation of application No. 16/905,168, filed on Jun. 18, 2020, now Pat. No. 11,766,772, which is a (Continued)

(51) Int. Cl.
*B25C 5/11* (2006.01)
*B25C 5/06* (2006.01)
(Continued)

(52) U.S. Cl.
CPC .................. *B25C 5/11* (2013.01); *B25C 5/06* (2013.01); *B25C 5/1665* (2013.01); *B25C 5/1696* (2013.01); *B25D 1/005* (2013.01)

(58) Field of Classification Search
CPC .. B25D 1/005; B25C 5/06; B25C 5/11; B25C 5/1696; B25C 5/1665
See application file for complete search history.

(56) References Cited

U.S. PATENT DOCUMENTS 2,432,853 A 12/1947 Barclay
2,519,617 A 8/1950 Wember
(Continued)

FOREIGN PATENT DOCUMENTS

CN 103419180 12/2013
DE 3940863 A * 2/1991 ........... B25C 5/0242
(Continued)

OTHER PUBLICATIONS

Extended European Search Report issued Feb. 16, 2017 in corresponding European patent application No. 16185541.6.
(Continued)

*Primary Examiner* — Joshua G Kotis
(74) *Attorney, Agent, or Firm* — Pillsbury Winthrop Shaw Pittman LLP

(57) ABSTRACT

A hammer tacker comprises a housing, a staple holder, and a latch operatively connected to the staple holder. The latch comprises a pivotable press member that is movable about a pivot axis between a lock position and a release position. The pivotable press member is resiliently biased towards the lock position. An elongated body of the staple holder is biased towards a normal position and movable against such bias to a jam release position while the staple holder remains in the operative position. The elongated body has a rearward portion thereof extending in longitudinally overlapping relation with a rearward portion of the pivotable press member, such that pivotal movement of the pivotable press member towards the rearward portion of the elongated body causes the pivotable press member to be moved from the lock position to the release position.

7 Claims, 16 Drawing Sheets

Related U.S. Application Data division of application No. 15/235,055, filed on Aug. 11, 2016, now Pat. No. 10,730,173.

(60) Provisional application No. 62/209,138, filed on Aug. 24, 2015.

(51) Int. Cl.
*B25C 5/16* (2006.01)
*B25D 1/00* (2006.01)

(56) References Cited

U.S. PATENT DOCUMENTS

| | | | | |
|---|---|---|---|---|
| 2,645,773 | A | 7/1953 | Dugin | |
| 2,661,999 | A | 12/1953 | Abrams | |
| 2,769,173 | A | 11/1956 | Lindstrom | |
| 3,613,753 | A | 10/1971 | Wolf | |
| 3,792,725 | A | 2/1974 | Burgeson | |
| 4,113,164 | A * | 9/1978 | Muthenthaller | B25C 5/11 227/127 |
| 4,165,771 | A | 8/1979 | Curati, Jr. | |
| 4,631,012 | A | 12/1986 | Eckman | |
| 4,706,866 | A | 11/1987 | Ebihara | |
| 5,408,902 | A | 4/1995 | Burnett | |
| 5,490,437 | A | 2/1996 | Hebert et al. | |
| 5,588,343 | A | 12/1996 | Rust | |
| 5,597,107 | A | 1/1997 | Knodel et al. | |
| 5,657,674 | A | 8/1997 | Burnett | |
| 5,735,444 | A * | 4/1998 | Wingert | F16B 15/0015 227/119 |
| 5,899,374 | A * | 5/1999 | Chen | B25C 5/1696 227/120 |
| 5,967,397 | A * | 10/1999 | Fealey | B25C 5/1644 227/120 |
| 5,975,401 | A | 11/1999 | Fealey | |
| 6,012,623 | A * | 1/2000 | Fealey | B25C 5/11 227/139 |
| 6,367,676 | B1 * | 4/2002 | Opland | B25C 5/1696 227/123 |
| 6,467,376 | B1 | 10/2002 | Wu | |
| 7,232,050 | B2 | 6/2007 | Omli | |
| 7,234,621 | B2 | 6/2007 | Marks | |
| 7,506,789 | B2 | 3/2009 | Shor | |
| 7,530,483 | B2 | 5/2009 | Bruins et al. | |
| 7,537,147 | B2 | 5/2009 | Ebbesson | |
| 7,628,305 | B2 | 12/2009 | Vanden Berg et al. | |
| 7,665,390 | B2 | 2/2010 | Hoffman | |
| 7,699,202 | B2 | 4/2010 | Shor | |
| 7,836,970 | B2 | 11/2010 | Bruins et al. | |
| 7,922,059 | B2 | 4/2011 | Schiestl et al. | |
| 7,975,892 | B2 | 7/2011 | Yeh | |
| 8,047,099 | B2 | 11/2011 | St. John et al. | |
| 8,104,379 | B2 | 1/2012 | Hanlon | |
| 8,146,789 | B2 | 4/2012 | Hu et al. | |
| 8,201,481 | B2 | 6/2012 | Williams | |
| 8,251,273 | B2 | 8/2012 | Shor | |
| 8,479,612 | B2 | 7/2013 | Sergyeyenko et al. | |
| 8,561,868 | B2 | 10/2013 | Shor | |
| 8,695,860 | B2 | 4/2014 | Wang et al. | |
| 9,415,494 | B2 * | 8/2016 | Sokol | B25C 5/162 |
| 9,776,313 | B2 * | 10/2017 | Hu | B25F 5/02 |
| 10,730,173 | B2 | 8/2020 | Pelletier et al. | |
| 2004/0164121 | A1 | 8/2004 | Lu | |
| 2004/0169059 | A1 | 9/2004 | Lu | |
| 2006/0112789 | A1 | 6/2006 | Hopper, Jr. | |
| 2006/0151566 | A1 * | 7/2006 | Ebihara | B25C 5/0235 227/120 |
| 2006/0249554 | A1 | 11/2006 | Butzen et al. | |
| 2007/0057010 | A1 | 3/2007 | Byrne | |
| 2008/0173457 | A1 | 7/2008 | Kahra | |
| 2008/0210059 | A1 | 9/2008 | Adams et al. | |
| 2010/0001033 | A1 | 1/2010 | Chen | |
| 2010/0038399 | A1 | 2/2010 | Martinez | |
| 2010/0077890 | A1 | 4/2010 | Neiser et al. | |
| 2011/0031295 | A1 | 2/2011 | Yeh et al. | |
| 2011/0049214 | A1 * | 3/2011 | Co | B25C 5/0235 227/132 |
| 2011/0049215 | A1 | 3/2011 | McAfee et al. | |
| 2011/0168755 | A1 * | 7/2011 | Wang | B25C 5/11 227/120 |
| 2011/0198381 | A1 | 8/2011 | McCardle et al. | |
| 2011/0248066 | A1 | 10/2011 | Hu et al. | |
| 2011/0314971 | A1 | 12/2011 | Nicosia | |
| 2012/0286016 | A1 | 11/2012 | Francis | |
| 2012/0304836 | A1 | 12/2012 | Haman | |
| 2013/0221056 | A1 * | 8/2013 | Chen | B25C 5/1644 227/120 |
| 2013/0228608 | A1 * | 9/2013 | Sokol | B25C 5/11 227/129 |
| 2013/0320065 | A1 | 12/2013 | Gregory | |
| 2014/0000116 | A1 | 1/2014 | Brobeil et al. | |
| 2014/0097228 | A1 | 4/2014 | Taylor | |
| 2014/0175144 | A1 | 6/2014 | Chen | |
| 2014/0231486 | A1 | 8/2014 | Burch et al. | |
| 2015/0060100 | A1 | 3/2015 | Monroy et al. | |
| 2015/0336254 | A1 | 11/2015 | Stetson et al. | |
| 2016/0184948 | A1 | 6/2016 | Padget | |
| 2016/0185003 | A1 | 6/2016 | Padget | |
| 2017/0057071 | A1 | 3/2017 | Pelletier et al. | |
| 2017/0341211 | A1 | 11/2017 | Franz | |

FOREIGN PATENT DOCUMENTS

| | | |
|---|---|---|
| EP | 1105020 | 8/2002 |
| EP | 1868776 | 3/2011 |
| EP | 2881222 | 6/2015 |
| TW | M298499 | 10/2006 |
| TW | 201134619 | 10/2011 |

OTHER PUBLICATIONS

Examination Report issued for corresponding European Patent Application No. 16185541.6, dated Nov. 21, 2019.

"FRP vs. Traditional Materials", Bedford Reinforced Plastics, 2017 [retrieved on Jan. 10, 2020], Retrieved from <URL:https://bedfordreinforced.com/app/uploads/2017 /08/BRP-FRP-vs-Traditional-Materials.pdf>, 4pgs (Year: 2017).

"Stanley Bostitch Model PC2K Power Slam™", Stanley Bostitch, Oct. 2004 Rev A [retrieved on Jan. 10, 2020], Retrieved from < URL:https://servicenet.bostitch.com/documents/English/Instruction%20Manual/Bostitch/166928REVA,PC2K.pdf?_ga=2.13236151.1879397507.1578675599-789498814.1552329966>, 1pg (Year: 2004).

"Features And Benefits Of FRP Versus Metal", VertMarkets, Inc., Jun. 13, 2014 [retrieved on Jan. 10, 2020], Retrieved from <URL:https://www.wateronline.com/doc/features-and-benefits-of-frp-versus-metal-0001>, 1 pg (Year: 2014).

"Senco 2015 Product Catalog", Senco, 2015 [retrieved on Jan. 10, 2020], Retrieved from <URL:https://web.archive.org/web/20150918173427/http://www.senco.com/docs/default-document-library/productcatalog.pdf?sfvrsn=2>, 3pgs (Year: 2015).

"BOSTITCH", 2013, Stanley Black & Decker, Inc., 34pgs. (Year: 2013).

"Bostitch PC2K Power Slam Hammer Tacker 1/4-Inch to 3/8-Inch Manual Construction", Jul. 2, 2004, Amazon.com, Inc., 12pgs. (Year: 2004).

* cited by examiner

HAMMER TACKER

CROSS-REFERENCE TO RELATED APPLICATIONS

This application is continuation of U.S. patent application Ser. No. 16/905,168, filed Jun. 18, 2020, now allowed, which is a divisional of U.S. patent application Ser. No. 15/235,055, filed Aug. 11, 2016, now granted as U.S. Pat. No. 10,730,173, which claims priority to U.S. Provisional Application No. 62/209,138, filed on Aug. 24, 2015, the contents of which are incorporated herein by reference in their entirety.

BACKGROUND

Field

The present patent application pertains to fastening tools in general and in particular to hammer tackers.

Discussion of Related Art

Hammer tackers are tools that can be used for fastening cardboard, fabric, plastic or other sheets of material to other similar sheets of material or to a substrate or workpiece such as wood, plastic, wood composite, drywall or the like. A hammer tacker, as the name indicates, operates similar to a hammer in that it is swung like a hammer, and when the head of the hammer tacker strikes a hard surface of an object or workpiece (e.g., wood), a staple is ejected and is inserted into the object. A hammer tacker can be used for various purposes including installing roofing paper, carpet backing, insulation, house wrap, just for example.

BRIEF SUMMARY

An aspect of the present disclosure is to provide a hammer tacker including an outer housing having a handle portion and a head portion, the outer housing formed from a fiber reinforced polymer material. The hammer tacker further includes an elongated staple holder carried at least partially within the outer housing, the elongated staple holder being slideable between a use position and a refill position. The outer housing having the fiber reinforced polymer material defines a channel extending through the handle portion and into the head portion. The channel is configured to receive the staple holder. The staple holder is slidable along the channel of the outer housing between the use position and the refill position. The hammer tacker also includes a staple driver assembly operable to drive a staple from the staple holder into a workpiece.

Another aspect of the present disclosure is to provide a hammer tacker including an outer housing having a handle portion and a head portion, the outer housing formed from a fiber reinforced polymer material. The hammer tacker also includes an elongated staple holder configured to carry a predetermined maximum capacity of staples. The elongated staple holder is operatively associated with the outer housing. The hammer tacker further includes a staple driver assembly operable to drive a staple from the staple holder into a workpiece. A ratio of a total weight of the hammer tacker in lbs., with the staple holder devoid of staples, divided by the maximum capacity of staples is less than 0.012 lb/staple.

Another aspect of the present disclosure is to provide a hammer tacker having an outer housing including a handle portion and a head portion, the outer housing formed from a fiber reinforced polymer material. The hammer tacker also includes an elongated staple holder configured to carry a predetermined maximum capacity of staples, the staple holder being operatively associated with the outer housing. The hammer tacker further includes a staple driver assembly operable to drive a staple from the staple holder into a workpiece. A ratio of the total weight in lbs., with the staple holder devoid of staples, to length in inches of the hammer tacker is less than 0.13 lb/inch.

Yet another aspect of the present disclosure is to provide a hammer tacker including a housing and a staple holder comprising an elongated body configured to extend along a length of the housing. The staple holder is movable between an operative position secured within the housing, and a refill position wherein the staple holder extends outwardly from the housing. The hammer tacker further includes a latch operatively connected to the staple holder. The latch includes a pivotable press member that is movable about a pivot axis between a lock position wherein the pivotable press member is configured to lock against the housing and secure the staple holder in the operative position, and a release position wherein the pivotable press member is released from the housing to enable the staple holder to move to the refill position. The pivotable press member is resiliently biased towards the lock position. The pivotable press member including the pivot axis thereof and the elongated body are mounted for limited linear movement therebetween from a normal position to a jam release position. The elongated body is biased towards the normal position and movable against such bias to the jam release position while the staple holder remains in the operative position. The elongated body has a rearward portion thereof extending in longitudinally overlapping relation with a rearward portion of the pivotable press member, such that pivotal movement of the pivotable press member towards the rearward portion of the elongated body causes the pivotable press member to be moved from the lock position to the release position.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the disclosure, the structural components illustrated herein are drawn to scale. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

DETAILED DESCRIPTION OF EMBODIMENTS

Figure 1:
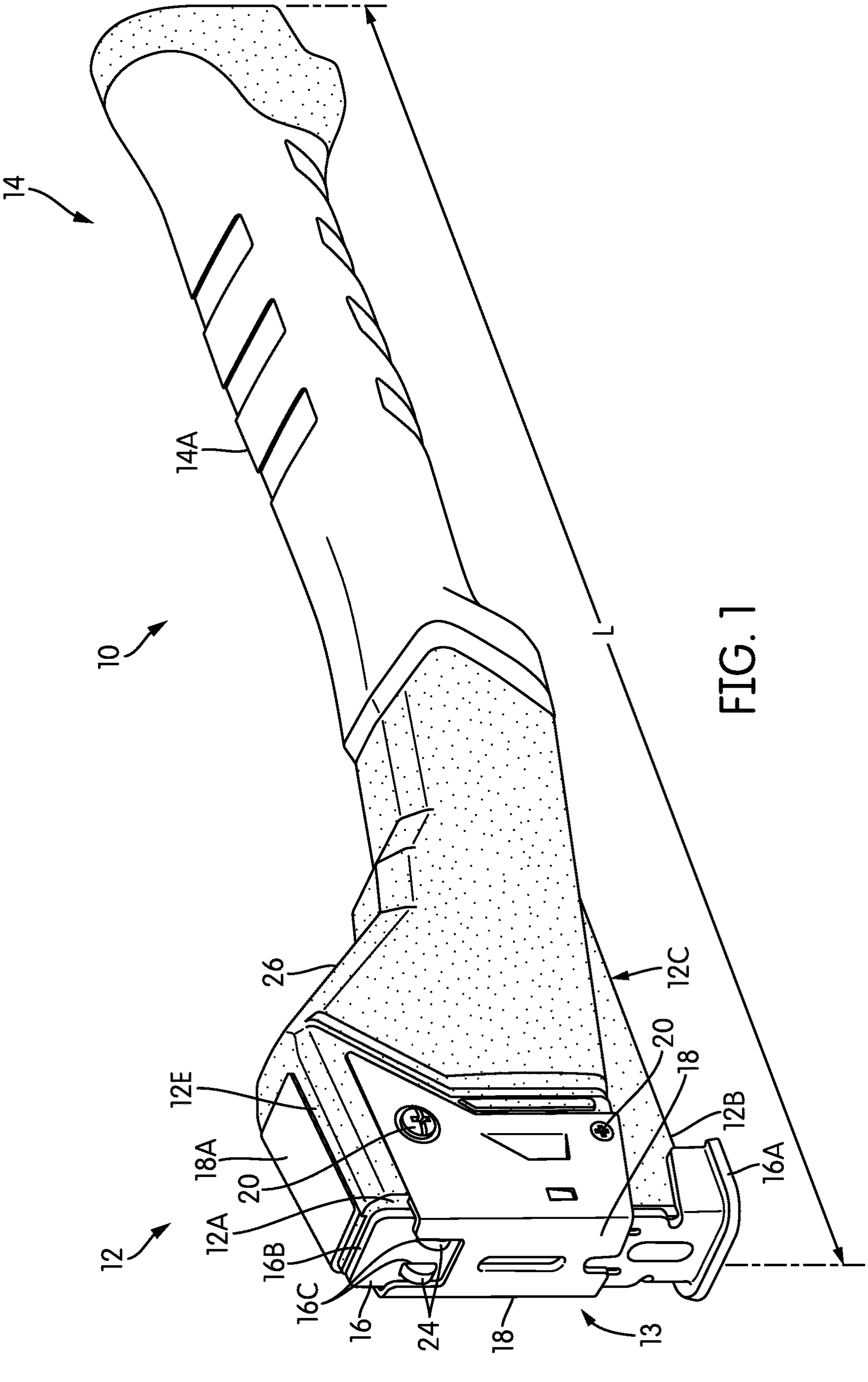
FIG. 1 depicts a perspective view of a hammer tacker, according to an embodiment of the present disclosure.

FIG. 1 depicts a perspective view of a hammer tacker, according to an embodiment of the present disclosure. The hammer tacker 10 includes a head portion 12 and a handle portion 14 connected to the head portion 12. The hammer tacker further includes an outer housing 26 that forms part of the head portion 12 and part of the handle portion 14. The outer housing 26 is generally hollow, having a closed sleeve or tubular portion 14A at the handle portion 14, and having a bottom opening 12C (see FIG. 3D) and front opening 12D at the head portion 12 (shown in FIG. 2). The hammer tacker 10 comprises a staple driver assembly 13 provided at the head portion 12. The staple driver assembly 13 includes an impact plate 16 and a front cover 18 configured to hold the impact plate 16. The impact plate 16 is held against a front surface 12A of the outer housing 26 in the head portion 12 by the front cover 18. The front cover 18 further shields the impact plate 16 from damage. The front cover 18 is attached to outer housing 26 in the head portion 12 using fasteners 20 such as screws, bolts, rivets or the like. The front cover 18 has a folded portion 18A that is folded over a top portion 12E of the outer housing 26 in the head portion 12. The folded portion 18A of the front cover 18 can prevent the front cover 18 from bending and binding the hammer tacker 10 when dropped. A bottom end portion of the impact plate 16 has an outwardly extending flange or lip portion 16A. When in use, the lip portion 16A of the impact plate 16 is configured to strike an object. The lip 16A of the impact plate 16 is spaced apart by a distance H from a bottom 12B of the outer housing 26 in the head portion 12 to allow clearance for the stroke of the hammer tacker 10. In an embodiment, the impact plate 16 does not extend out from the front cover 18 when the hammer tacker 10 is fully actuated. In other words, an end portion 16B of the impact plate 16 opposite the lip portion 16A does not extend out of the folded portion 18A of the front cover 18 that is folded over a top portion 12E of the outer housing 26 in the head portion 12. In another embodiment, the impact plate 16 extends from the front cover 18 when the hammer tacker 10 is fully actuated. In an embodiment, the impact plate 16 and the front cover 18 are made of metal such as, for example, steel, iron, aluminum, etc.

Figure 2:
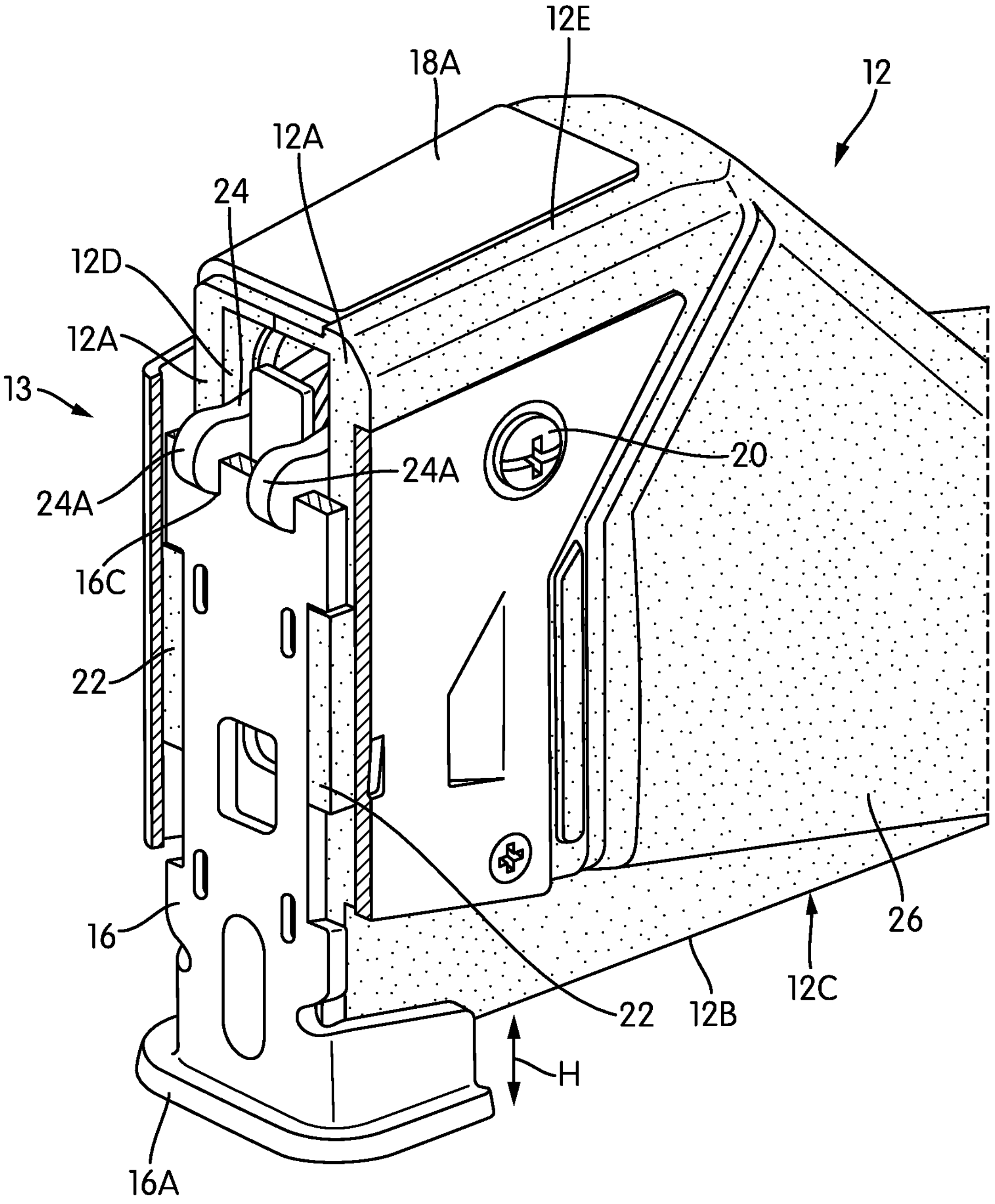
FIG. 2 depicts a perspective internal view of a head portion of the hammer tacker, according to an embodiment of the present disclosure.

FIG. 2 depicts a perspective internal view of the head portion 12, according to an embodiment of the present disclosure. The outer housing 26 includes tabs 22 that project from the front surface 12A of the outer housing 26 in head portion 12. The tabs 22 are configured to hold and guide a sliding movement of the metal impact plate 16. The staple driver assembly 13 further includes activation arms 24 provided within the outer housing 26. In an embodiment, the impact plate 16 engages ends (e.g., lobs) 24A of activation arms 24 through openings 16C provided at the top of the impact plate 16. In one embodiment, a pair of activation arms 24 is provided, as shown in FIG. 2. However, as it can be appreciated, one, two or more activation arms can be used. The ends 24A of activation arms 24 are configured to prevent the impact plate 16 from falling off of the hammer tacker 10. Although the ends 24A of activation arms 24 are shown having the shape of lobs, as it can be appreciated other forms or shapes are also contemplated, such as polygonal shapes or the like. The activation arms 24 are connected to the outer housing 26 as will be described in detail in the following paragraphs. In an embodiment, the activation arms 24 are made of metal such as, for example, steel, iron, aluminum, etc.

Figure 3A:
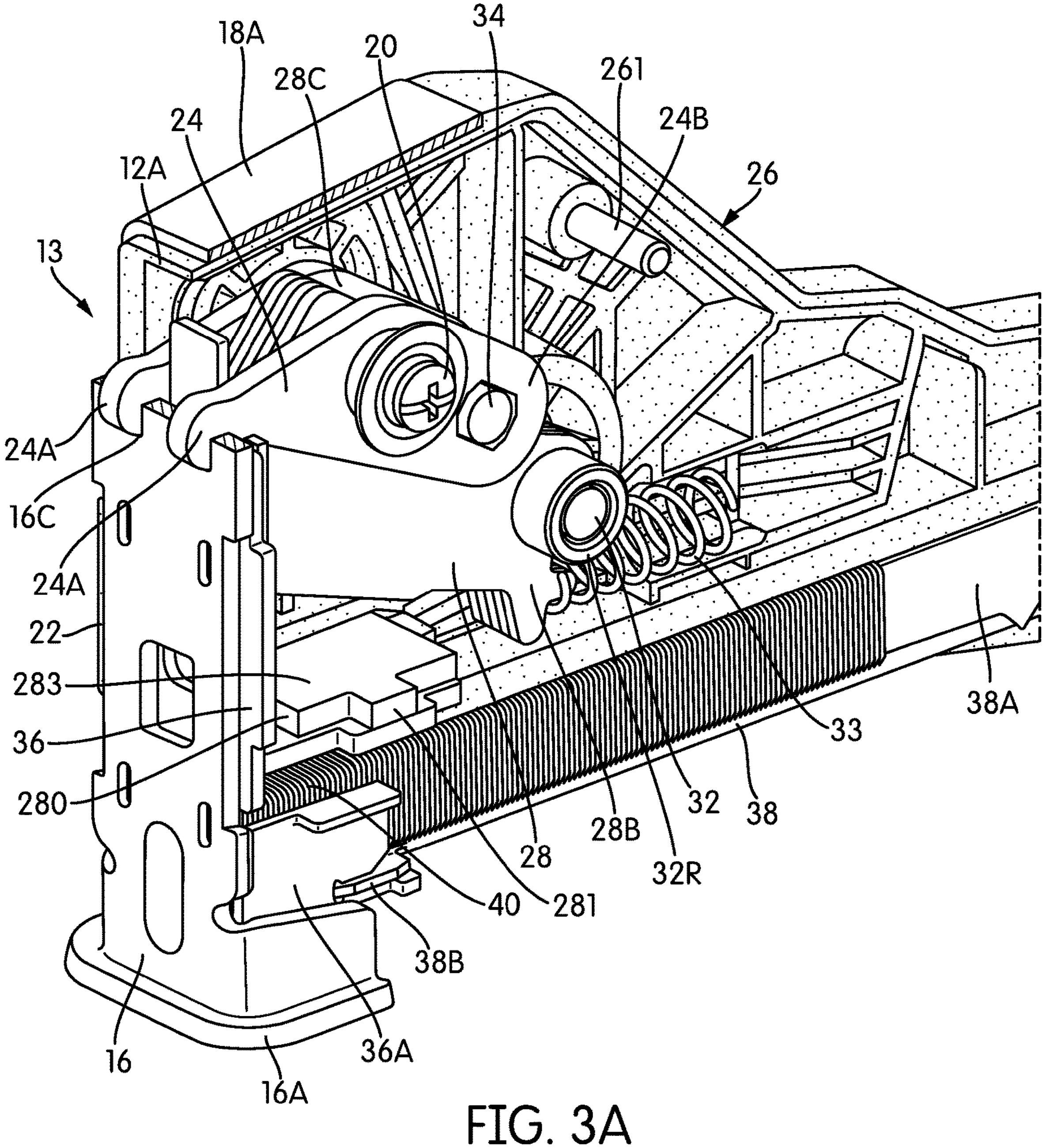
FIGS. 3A and 3B depict perspective internal views of the head portion of the hammer tacker, according to an embodiment of the present disclosure.
Figure 3B:
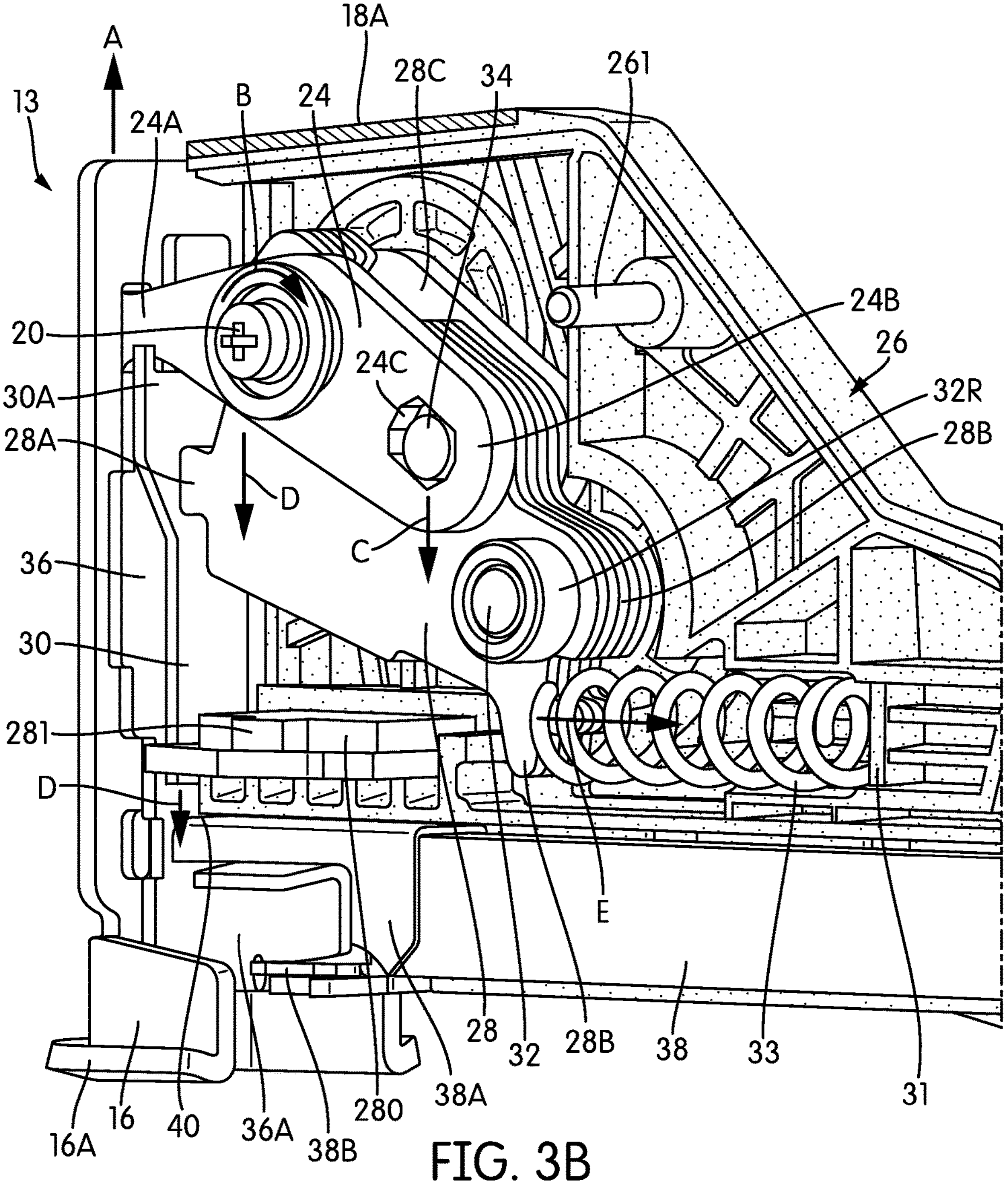

FIGS. 3A and 3B depict perspective internal views of the head portion 12, according to an embodiment of the present disclosure. FIGS. 3A and 3B depict a portion the outer housing 26 in the head portion 12. In an embodiment, the outer housing 26 is constructed of carbon fiber reinforced polymer. In another embodiment, the outer housing 26 is constructed using glass fiber reinforced polymer. In an embodiment, the carbon reinforced polymer material comprises between approximately 10% and approximately 40% by volume of carbon fiber. In an embodiment, the polymer is nylon and the carbon reinforced polymer is a carbon fiber reinforced nylon material. In an embodiment, the carbon fiber reinforced nylon material comprises between approximately 15% and approximately 30% by volume of carbon fiber. In an embodiment, the carbon fiber reinforced nylon material comprises 25% by volume of carbon fiber. However, as it can be appreciated other strength reinforced polymers can be used. The outer housing 26 includes a plurality of ribs 26A and bosses 26B (shown in FIG. 5) to strengthen the outer housing 26 and also to provide support for the attachment of the activation arms 24 and other features, as will described further in detail in the following paragraphs.

In an embodiment, the activation arms 24 are pivotally connected to the outer housing 26 via one of the fasteners (for example screw) 20 which is also used to hold the front cover 18. However, as it can be appreciated another fastener (for example, screw or pin) can be provided and dedicated to connect the activation arms 24 to the outer housing 26. The fastener 20 defines a pivot axis through which the activation arms 24 can rotate or pivot.

Figure 5:
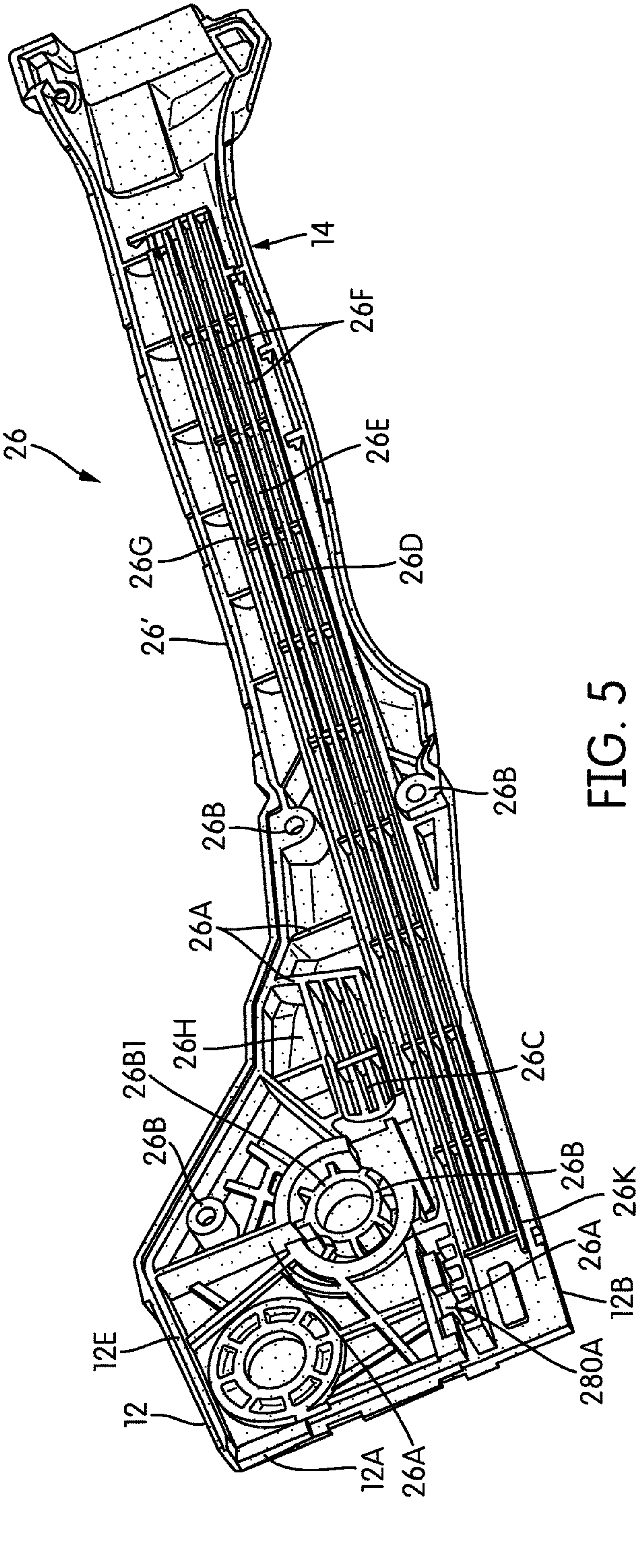
FIG. 5 depicts a perspective internal view of a half portion of an outer housing of the hammer tacker, according to an embodiment of the present disclosure.

The staple driver assembly 13 of the hammer tacker 10 also includes a driver plate (e.g., made of metal such as, for example, steel, iron, aluminum, etc.) 28 and a strike plate 30 (e.g., made of metal such as, for example, steel, iron, aluminum, etc.), as shown in FIGS. 3A and 3B. An end 28A of the driver plate 28 is in contact with end 30A of strike plate 30 so that when the driver plate 28 is moved (rotated), movement is transmitted to the strike plate 30 which in turn drives a staple 40 into a workpiece (not shown). An end 28B of the driver plate 28 opposite to the end 28A is connected to the outer housing 26 through a pivot pin 32 (load bearing pin) that defines a pivot axis about which the driver plate 28 is pivotable. In an embodiment, the pivot pin 32 is made of metal such as, for example, steel, iron, aluminum, etc. In an embodiment, the pivot pin (load bearing pin) 32 includes an outer ring or bearing 32R to reduce friction when the pivot pin 32 rotates. The bearing portion 32R of pivot 32 engages a boss or opening 26B1 (shown in FIG. 5), which is formed by being integrally molded or formed with the rest of the housing 26 (half the housing being shown in FIG. 5). The boss or opening 26B1 receives a bearing load during operation of the hammer stapler, as it receives bearing forces from the pin 32 as it rotates. It should be appreciated that another bearing pin 32 and boss or opening 26B1 is provided on the opposite side of the stapler as well (on the opposite side of the stapler in relation to what is shown in FIG. 5, e.g., a mirror image of what is shown in FIG. 5. A resilient member (e.g., spring) 33 is provided inside the outer housing 26 such that an end of the resilient member 33 abuts an internal wall or rib 31 molded as part of the outer housing 26, and another end of the resilient member 33 abuts end 28B of the driver plate 28 to bias the driver plate 28 in a position away from the strike plate 30. A resilient bumper element (for example, made of a resilient polymer) 280 is provided within the housing 26 as a stop to stop the movement of the driver plate 28 when the driver plate 28 rotates downwardly and the driver plate 28 engages surface 283 of the resilient bumper element 280. In an embodiment, the resilient bumper element 280 has a cross or "T" shape having arms 281 that engage holes, depressions or notches 280A within the housing 26 (shown in FIG. 5). A slot or opening 28C is provided in the driver plate 28 to allow the fastener 20 to pass therethrough so as not to impede or hinder the movement or rotation of the driver plate 28.

At opposite ends 24B from the ends (e.g., lobs) 24A of activation arms 24 is provided a pin 34 that links the activation arms 24 to the driver plate 28. In an embodiment, the pin 34 is rigidly connected to the driver plate 28 and is connected to the activation arms 24 through openings or slots 24C provided at ends 24B of activation arms 24. In an embodiment, the pin 34 is made from metal such as, for example, steel, iron, aluminum, etc.

The staple driver assembly 13 of the hammer tacker 10 further includes a drive guide (e.g., made of metal such as, for example, steel, iron, aluminum, etc.) 36 that is generally disposed between the strike plate 30 and the impact plate 16. In an embodiment, the drive guide 36 has generally an "L" shape having an end 36A configured to receive an elongated staple holder 38. In an embodiment, the elongated staple holder 38 comprises metal (such as for example, steel, iron, aluminum, etc.) or fiber reinforced polymer (such as carbon fiber reinforced polymer). An opening 37 (shown in FIG. 11) is provided at the bottom of the end 36A of the drive guide 36 so as to allow a staple 37S (shown in FIG. 11) to exit the elongated staple holder 38 when the hammer tacker 10 is actuated. In an embodiment, the elongated staple holder 38 is configured to carry two sticks of staples. In an embodiment, each stick of staples contains 88 staples. Therefore, in one embodiment, the staple holder 38 is configured to carry 176 staples. It should be appreciated, however, that in another embodiment, the entire hammer tacker 10 (and staple holder 38) may be configured to hold only a single stick of staples. In that case, the entire size and weight of the hammer tacker 10 can be made smaller. In one embodiment, the hammer tacker 10 can be made proportionally smaller. In one embodiment, the hammer tacker 10 can also be made proportionally lighter. It should also be appreciated that the number of staples per staple stick can be more or less than 88, without departure from the principles set forth herein. In one embodiment, the hammer tacker 10 can accommodate three or more staple sticks.

Figure 10A:
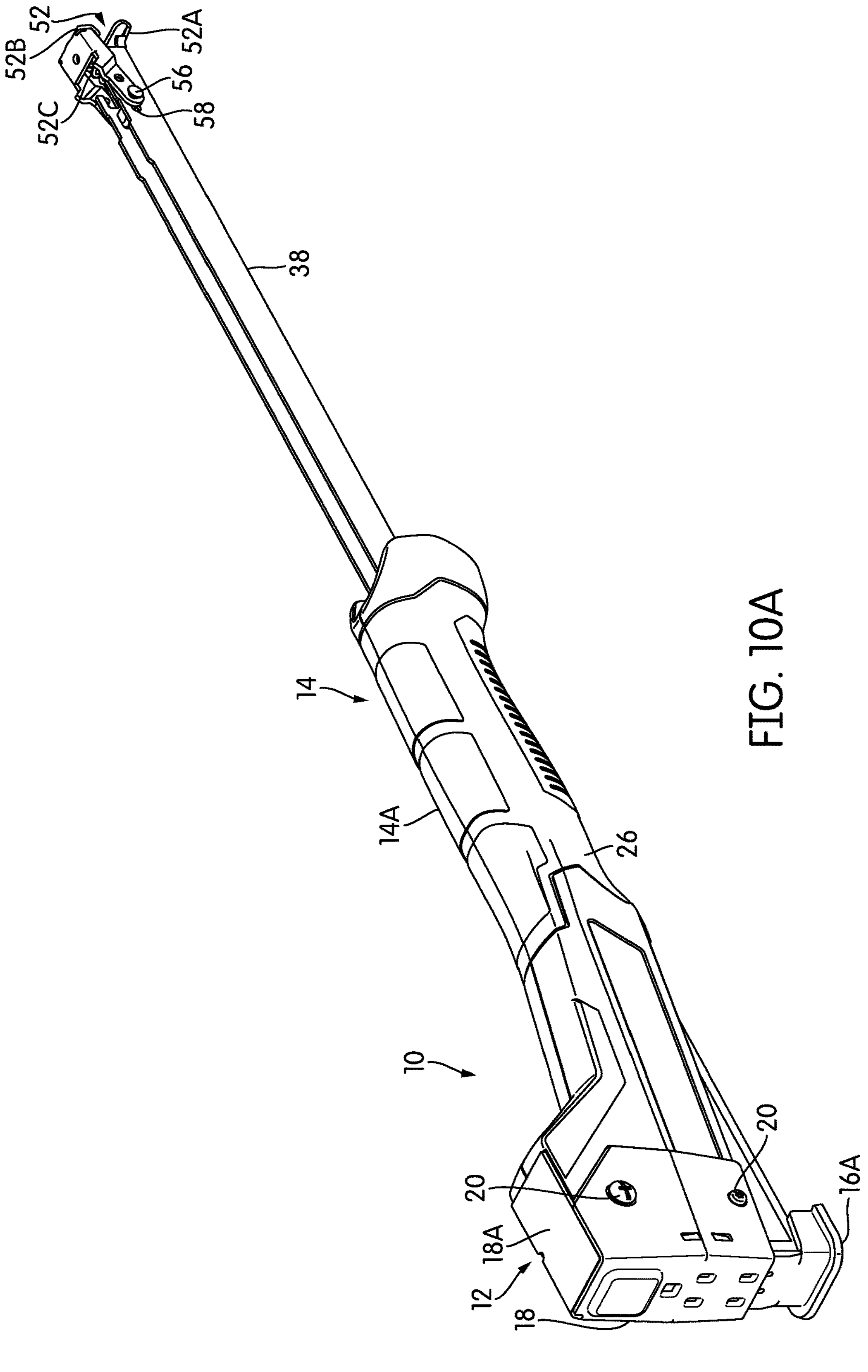
FIG. 10A is a perspective view of the hammer tacker shown in FIG. 1 in the refill position wherein the elongated staple holder extends outwardly from the housing of the hammer tacker to refill the hammer tacker with staples, according to an embodiment of the present disclosure.
Figure 10B:
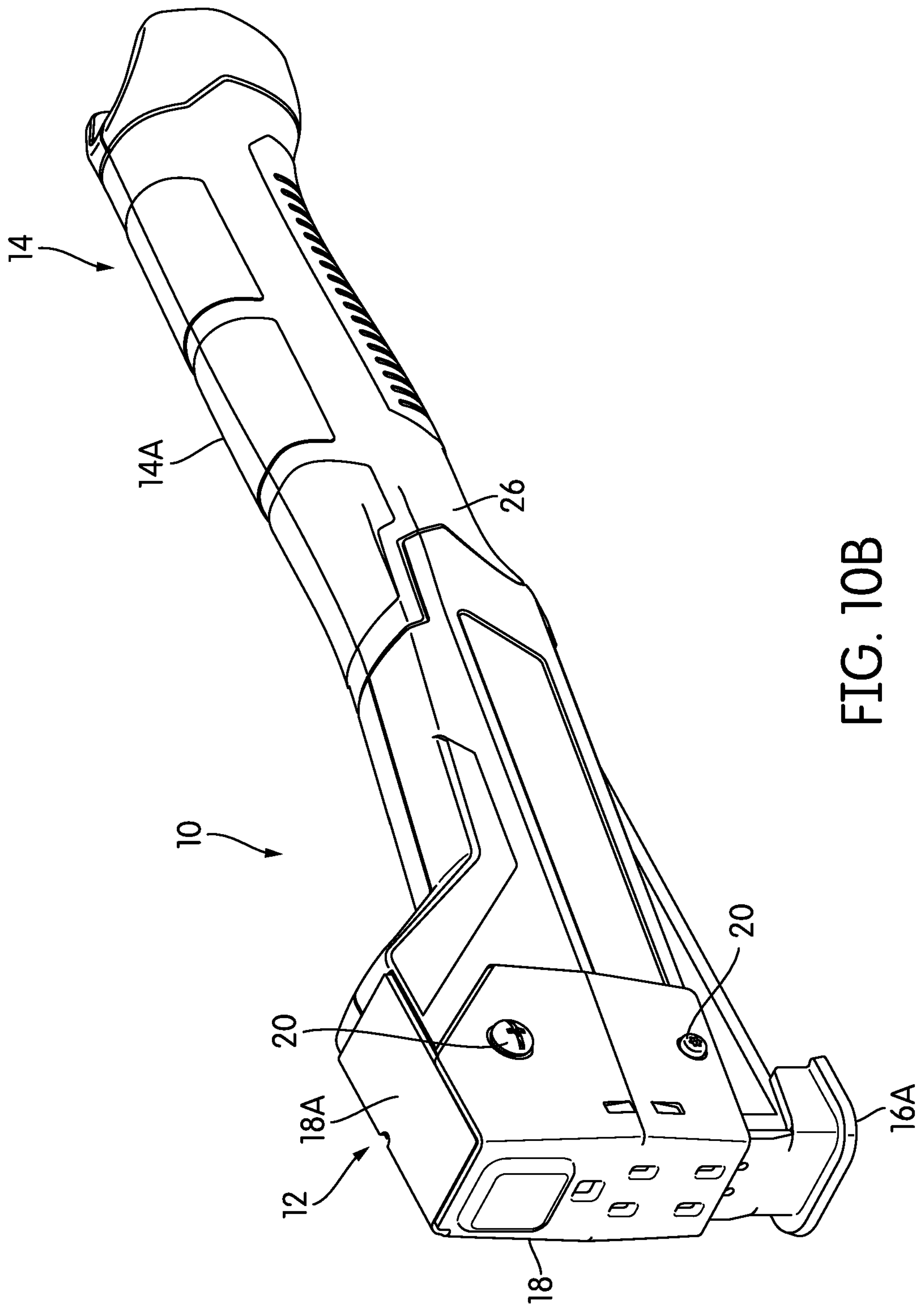
FIG. 10B is a perspective view of the hammer tacker shown in FIG. 1 in a use position wherein the elongated staple holder is secured within the housing to allow the user to operate the hammer tacker, according to an embodiment of the present disclosure.
Figure 11:
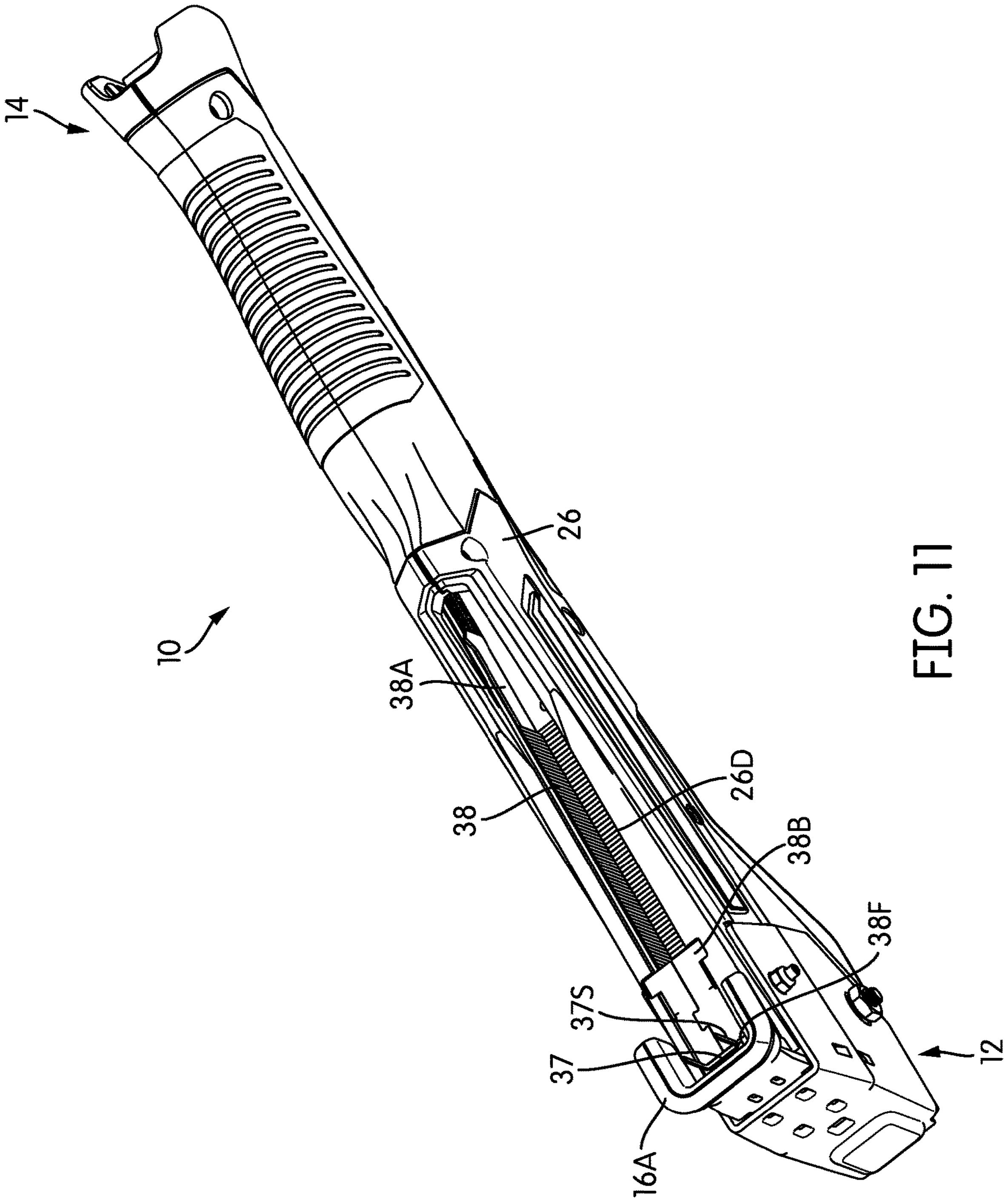
FIG. 11 is perspective view of the hammer tacker shown in FIG. 1 in a use position showing the underside of the hammer tacker wherein staples are positioned between the staple holder and a surface of a cavity within the housing, according to an embodiment of the present disclosure.

The elongated staple holder 38 is carried at least partially within the outer housing 26. The elongated staple holder 38 is slidable between a use (operative) position and a refill position, as shown in FIGS. 10A and 10B. In the refill position, as depicted in FIG. 10A, the elongated staple holder 38 extends outwardly from the housing 26 to allow a user to refill the hammer tacker 10 with staples. The user can refill the hammer tacker 10 with staples by disposing the staples (e.g., a stick of staples) within elongated channel cavity 26D (shown in FIGS. 3C, 3D and 11) extending through the handle portion 14 and into the head portion 12. The staple holder 38 is slidable within the channel cavity 26D of the outer housing 26 between the use position and the refill position. In the use or operative position, as shown in FIG. 10B, the elongated staple holder 38 is secured within the outer housing 26 to allow the user to operate the hammer tacker 10 to drive staples into a workpiece (not shown). In the operative position, as illustrated in FIG. 11, the staples are positioned between the staple holder 38 and u-shaped channel surface 26J of channel cavity 26D in the housing 26 (shown in FIGS. 3C and 3D).

The elongated staple holder 38 includes a staple pusher 38A configured to push on staples to bias the staples towards the strike plate 30 in the staple driver assembly 13 located in the head portion 12. The staple pusher 38A slides on a surface of the elongated staple holder 38 to push on staples towards the strike plate 30. The staple holder 38 further includes a resilient member (e.g., spring) (not shown) that is configured and arranged to bias the staple pusher 38A to push on the staples towards the strike plate 30. In an embodiment, the staple pusher 38A is made of metal (such as, for example, steel, iron, aluminum, etc.) or fiber reinforced polymer (such as, for example, carbon fiber reinforced polymer, etc.).

Figure 4:
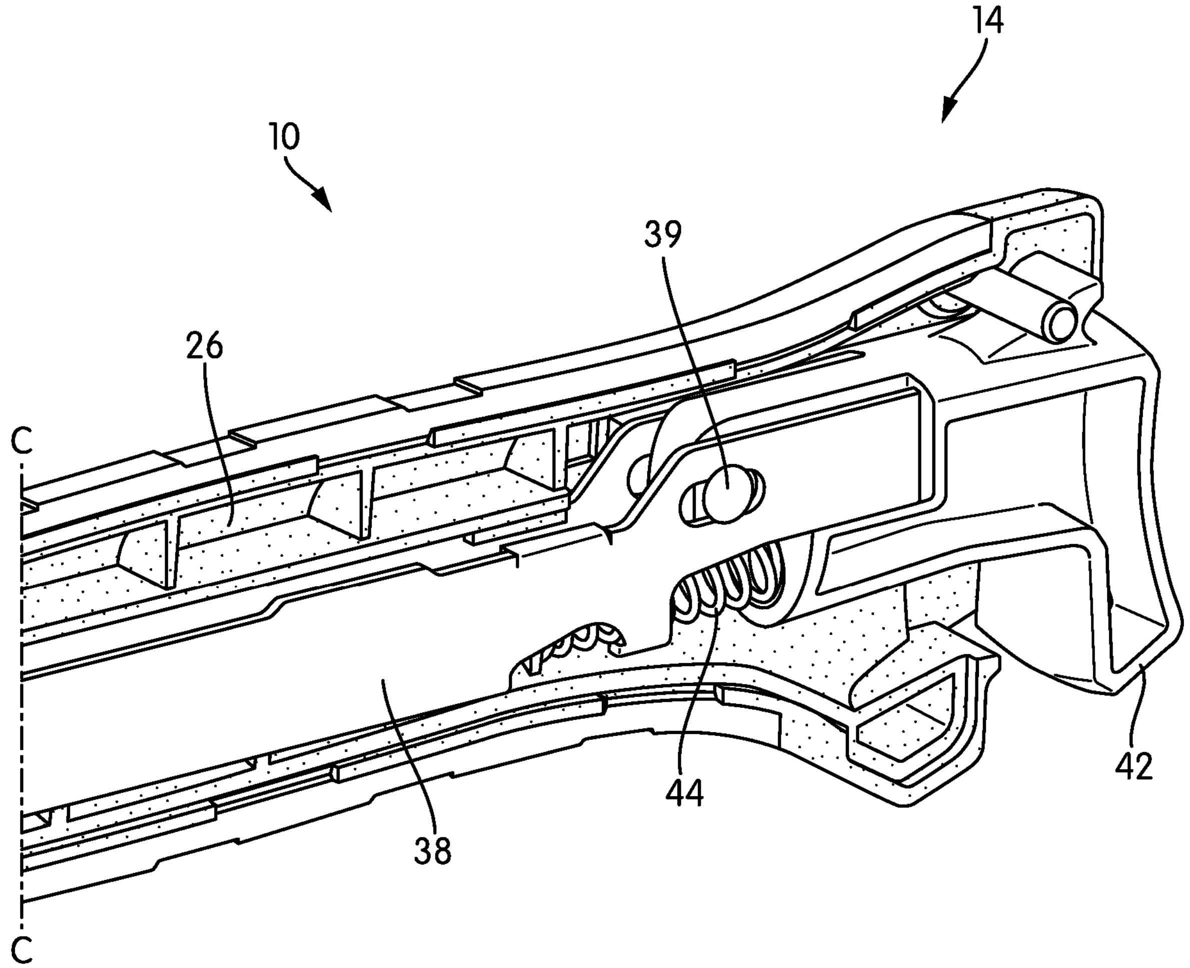
FIG. 4 depicts a perspective internal view of the handle portion of the hammer tacker, according to an embodiment of the present disclosure.

FIG. 4 depicts a perspective internal view of the handle portion 14 of the hammer tacker 10, according to an embodiment of the present disclosure. As shown in FIG. 4, the staple holder 38 extends a length of the hammer tacker inside the outer housing 26 from the head portion 12 to an extremity of the handle portion 14. In an embodiment, the staple holder 38 is attached to a cap 42 via pin 39. The cap 42 is removeably engageable with the outer housing 26 to facilitate loading and unloading of staples. A resilient member (e.g., a spring) 44 is provided to bias the cap 42 to engage the outer housing 26. To slide the staple channel holder 38 out of the outer housing 26, the cap 42 can be pressed and tilted to disengage the cap 42 from the outer housing 26. The staple holder 38 has the substantial majority thereof (substantially entirely) disposed within the housing 26 when in the use position and has the substantial majority thereof (substantially entirely) disposed rearwardly of the housing when in the refill position. In an embodiment, a transverse cross section "CC" taken through a middle of the handle portion 14, as shown for example in FIG. 4, is devoid of metal except for the staple holder 38.

Figure 9:
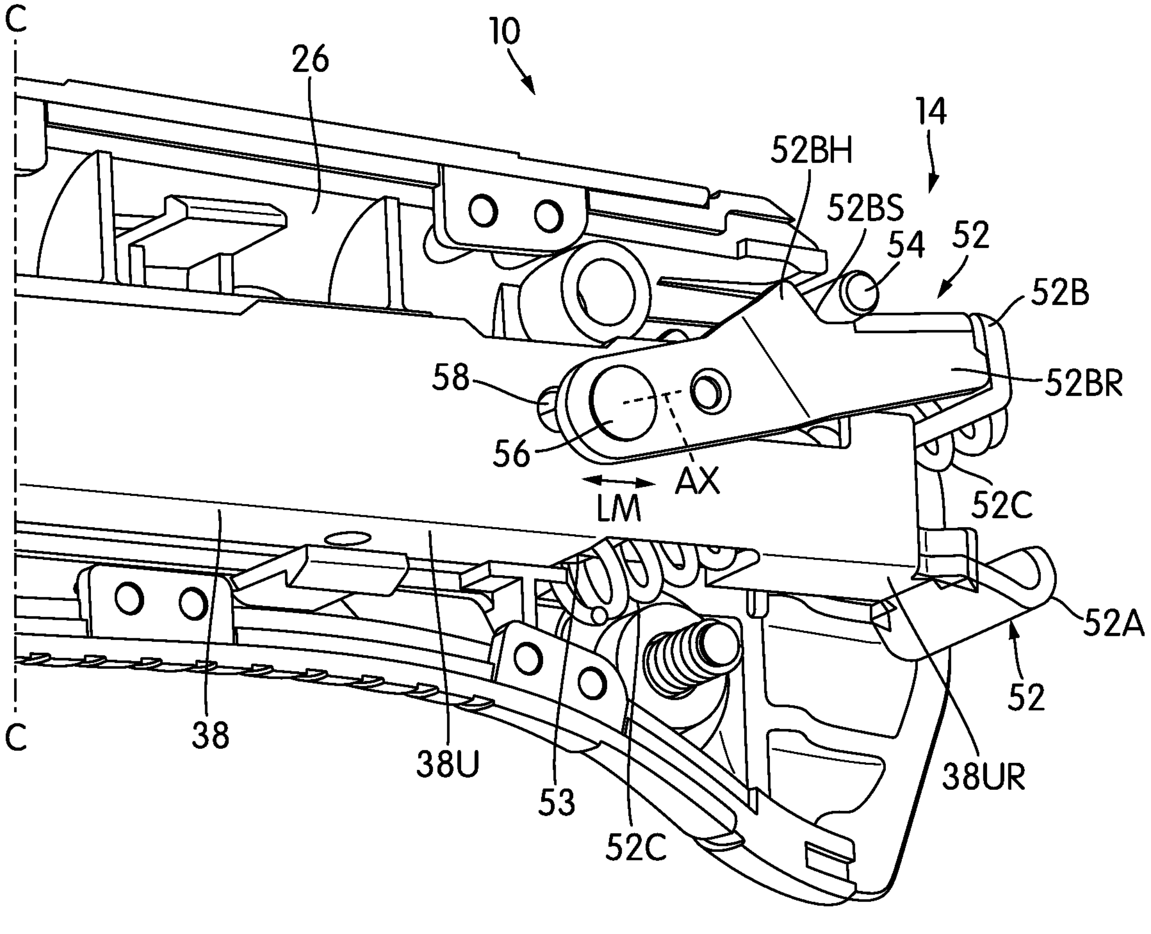
FIG. 9 depicts a perspective internal view of the handle portion of the hammer tacker, according to another embodiment of the present disclosure.

FIG. 9 depicts a perspective internal view of the handle portion 14 of the hammer tacker 10, according to another embodiment of the present disclosure. As shown in FIG. 9, the staple holder 38 has an elongated body 38U that extends a length of the hammer tacker inside the outer housing 26 from the head portion 12 to an extremity of the handle portion 14. In an embodiment, at an extremity of the staple holder 38 is provided a latch 52 configured to secure the staple holder 38 to the handle portion 14 via pin 54. The latch 52 is removeably engageable with the outer housing 26 to facilitate loading and unloading of staples. The latch 52 includes a curved portion 52A that is part of the staple holder 38 and a pivotable press member 52B that is configured to engage the pin 54. The pivotable press member 52B is pivotally connected to the staple holder 38 via pin 56 (defining a pivot axis). In one embodiment, the pin 56 is rigidly connected to the pivotable press member 52B and passes through a slot or opening 58 in the staple holder 38. The opening or slot 58 is configured so as to allow some longitudinal movement or translation of the pin 56 within the opening or slot 58.

In an embodiment, in the event of a staple jam, the latch 52 can be released to thus release the staple holder 38. In some instances, if a staple jam may occur, a staple becomes jammed between a front end of 38F of the staple holder and opening 37 within flange 38B. As a result, the space within the opening 37 is occupied by the jammed staple which forces the staple holder 38 to move backward towards the handle portion 14. Indeed, in this configuration, the pivotable press member 52B of the latch 52 and/or the staple holder 38 can move longitudinally relative to the other, allowing a user to either longitudinally move the staple holder 38 relative to the latch 52 when the latch 52 is fixed relative to the housing 26 (e.g., pin 54) or to longitudinally move the latch 52 (i.e., pivotable press member 52B) relative to the staple holder 38 when the staple holder is fixed relative to the housing 26.

Specifically, a resilient member 52C (e.g., a spring) of the latch 52 biases the pivotable press member 52B towards the lock position as well as biases the pivotable press member 52B and thus the pin 56 backwardly. The pin 56 that is rigidly connected to the pivotable press member 52B and passes through the slot or opening 58 in the elongated body 38U is thus configured to move within the slot or opening 58 relative to the elongated body 38U under the biasing force of the resilient member 52C. The resilient member 52C biases the pin 56 to bring the pin 56 in contact with a rearward edge of the slot 58. Therefore, in order to move the pin 56 relative to the elongated body 38U, the pivotable press member 52B can be pushed forward towards the head portion 12 to move the pin 56 from the rearward edge of the slot 58 towards a forward edge of the slot 58.

A staple may be stuck or jammed in a space between a forward portion 38F of the staple holder 38 and the opening 37 provided within the flange 38B, as shown in FIG. 11. As a result of the staple jam, the jammed staple pushes against the staple holder 38 which in turn moves backward towards the handle portion. Hence, in an embodiment, in order to remove the jammed staple, a user can push or pry the front end 38F of the staple holder 38 (e.g., using a tool such as a screwdriver) rearwardly relative to the housing 26 (or flange 38B) and move the staple holder 38 relative to the latch 52 (toward the latch) to dislodge the jammed staple from the opening 37. In another embodiment, to dislodge the jammed staple, a user can longitudinally push the pivotable press member 52B of the latch 52 forwardly relative to staple holder 38 towards the head portion 12 of the hammer tacker 10, and against the bias of the spring 52C, so that the press member pin 56 slides within slot 58 to enable the pivotable press member 52B to disengage the pivotable press member hook portion 52BH from the pin 54 and thus be rotated, so as to enable the staple holder 38 to be released from the housing 26 and thus allow the jammed staple to be removed from the opening 37.

The latch 52 includes resilient member (e.g., a spring) 52C that is adapted to spring-load or bias the pivotable press member 52B in an upper position so as to allow the pivotable press member 52B to removably engage the pin 54. One end of the resilient member 52C abuts an edge in an opening 53 within the staple holder 38 and an opposite end abuts an end of pivotable press member 52B. To slide the staple channel holder 38 out of the outer housing 26, the latch 52 can be held between the thumb and the index finger and a force is applied to squeeze or press the pivotable press member 52B towards the curved portion 52A. As a result, the pivotable press member 52B rotates around the pin 56 which disengages the pivotable press member 52B from the pin 54.

As it can be appreciated from the above paragraphs, in an embodiment, the hammer tacker 10 includes the housing 26 and the staple holder 38 having an elongated body 38U that is configured to extend along a length of the housing 26. The staple holder 38 is movable between an operative position secured within the housing 26, and a refill position wherein the staple holder 38 extends outwardly from the housing 26, as shown in FIGS. 10A and 10B and described in the above paragraphs.

The hammer tacker 10 also includes the latch 52 operatively connected to the staple holder 38. The latch 52 includes the pivotable press member 52B that is movable about a pivot axis AX (including the pin 56) between a lock position wherein the press member 52B is configured to lock against the pin 54 within the housing 26 and secure the staple holder 38 in the operative position, and a release position wherein the pivotable press member 52B is released from pin 54 within the housing 26 to enable the staple holder 38 to move to the refill position. In an embodiment, the pivotable press member 52B has a protruding or hook portion 52BH that is configured to releasably engage the pin 54. In an embodiment, the hook portion 52BH has a ramped or inclined surface 52BS that comes in contact with the pin 54. The ramped surface 52BS can be provided so as to facilitate release of the press member 52B from the pin 54 when the press member 52B is pressed. For example, this may be useful for releasing a jammed staple. In the operative position, the ramped surface 52BS of pivotable press member 52B abuts the pin 54 under the biasing force of the spring of spring 52C. In the event that a staple jam occurs, the staple holder 38 moves rearwardly relative to the housing 26 which pushes the pivotable press member 52B tighter against the pin 54. As a result, disengaging the pivotable press member 52B (or the hook 52BH) from the pin 54 can be hard. However, by configuring the contact surface of the hook 52BH as a ramped surface or inclined surface 52BS, a rotation of the pivotable press member can be facilitated. Indeed, as a user applies a force on the pivotable press member 52B, the hook 52BH slides against a surface of the pin 54 or the pin slides against the inclined surface 52BS of the hook 52BH which enables the staple holder 38 to move backwardly out of the housing 26.

The latch 52 also includes resilient member 52C (e.g., a spring) that is configured to bias the pivotable press member 52B towards the lock position. The elongated body 38U is mounted for limited longitudinal movement LM relative to pivotable press member 52B and the axis AX thereof from a normal position and a jam release position. In an embodiment, the pin 56 that is rigidly connected to the pivotable press member 52B and passes through the slot or opening 58 in the elongated body 38U is configured to move within the slot or opening 58 relative to the elongated body 38U. Similarly, the opening or slot 58 is configured so as to allow some longitudinal movement or translation LM of the elongated body 38U relative to the pin 56. The resilient member 52C biases the pivotable press member 52B and thus the pin 56 to bring the pin 56 in contact with a rearward edge of the slot 58.

The elongated body 38U is biased towards the normal position and movable against such bias to the jam release position while the staple holder 38 remains in the operative position. The normal position of the elongated body 38U corresponds to a position of the elongated body 38U where the elongated body 38U is biased forwardly towards the head portion 12 of the hammer tacker 10. Indeed, in the normal position or use position, the latch 52 (or the pivotable press member 52B) engages pin 54 that is rigidly mounted to the housing 26. Therefore, considering the housing 26 (or pin 54) in a fixed position, the spring 52 biases the elongated body 38U forwardly towards the head portion. The jam release position of the elongated body 38U corresponds to a position where the elongated body 38U is moved rearwardly against the forward bias towards the handle portion so as to enable release of a jammed staple. In the release position, while the latch 52 (or the pivotable press member 52B) remains engaged with the pin 54, the elongated body 38U can be moved rearwardly relative to the housing 26 (i.e., relative to the pin 54) against the biasing force of the spring 52C by applying a force on the front end 38F of the stable holder 38 (e.g., using a tool such as a screwdriver).

The elongated body 38U has a rearward portion 38UR extending in longitudinally overlapping relation with a rearward portion 52BR of the pivotable press member 52B, such that pivotal movement of the rearward portion 52BR of the pivotable press member 52B towards the rearward portion 38UR of the elongated body 38U, against the bias of resilient member (e.g., spring) 52C, causes the pivotable press member 52B to be moved from the lock position to the release position.

In an embodiment, the biasing or resilient member 52C includes a single spring that is configured to bias the pivotable press member 52B towards the lock position and bias the pivotable press member 52B and the pivot axis AX towards the normal position. However, in an alternate embodiment, the biasing of the pivotable press member 52B is accomplished by a separate spring from a secondary spring that is used to bias the elongated body 38U. The pivot axis includes pin 56 which passes through slot 58 provided in the elongated body 38U.

In operation, when the hammer tacker 10 is actuated and swung against a workpiece (e.g., wood), the lip 16A of the impact plate 16 comes in contact with the workpiece (not shown) and under the strike force, the impact plate 16 moves as indicated by the arrow "A", as shown in FIG. 3B. The impact plate 16 which is operatively connected to the activation arms 24 through lobs 24A pushes on the lobs 24 to pivot the activation arms 24 around pivot axis 20, as shown by the arrow "B." As a result, the end 24B of the activation arms 24 moves in the direction opposite to arrow "A" as depicted by arrow "C." The movement of the activation arms 24 in the direction of arrow "C" forces the pin 34 connected to the driver plate 28 to move in the direction of the arrow "C." As a result, the driver plate 28 rotates around the pivot pin 32 and end 28A of the driver plate 28 moves in the direction of arrow "D." As a result of the rotation of the driver plate 28 around the pivot pin 32, the end 28B of the driver plate 28 moves in a direction of arrow "E" to compress the resilient member 33. When the end 28A of the driver plate 28 moves in the direction of arrow "D," the driver plate 28 pushes the strike plate 30 in the direction of arrow "D" which in turn strikes a staple 40 from the staple holder 38 to drive the staple through the opening (not shown) in the drive guide 36 into the workpiece or object. After the staple is driven into the workpiece, the compressed spring 33 pushes the end 28B of the driver plate 28 forwardly opposite to arrow "E". As a result, the opposite end 28A of the driver plate 28 is moved upwardly opposite to arrow "D." This movement of the driver plate 28 forces the lobs 24A of activation arms 24 to move downwardly which moves the impact plate opposite to the arrow "A." As a result, the hammer tacker 10 is ready for a next strike.

FIG. 5 depicts a perspective internal view of a half portion 26' of outer housing 26, according to an embodiment of the present disclosure. As shown in FIG. 5, the outer housing 26 comprises a plurality of ribs 26A and bosses 26B. The various ribs 26A are configured and arranged to provide reinforcement for the outer housing 26 to achieve strength to withstand impact forces and to support the components of the hammer tacker 10. The various ribs 26A are also configured to reduce weight of the outer housing 26 and thus the overall weight of the hammer tacker 10, as will be explained in detail further below. The bosses 26B in the outer housing 26 are provided to support various attachments such as the pivot pin (load bearing pin) 32, guide pin 261, as well as various other fasteners to clamp two halves of the outer housing 26. For example, boss 26B1 comprises a mount structure that is formed in the outer housing 26 and configured to receive and provide load bearing support to the pivot pin 32 about which the driver plate 28 in the staple driver assembly 13 is pivotable. In an embodiment, the staple driver assembly 13 is operable to drive a staple from the elongated staple holder 38 into a workpiece. The elongated staple holder 38 is configured to have at least one stick of staples mounted thereon. The staple driver assembly 13 includes the pivot pin 32 about which a portion of the staple driver assembly 13 rotates during a stapling operation. The pivot pin 32 engages with the mount structure of the boss 26B1 formed in the fiber reinforced polymer material of the outer housing 26 such that the fiber reinforced polymer material of the housing 26 bears a load from the pivot pin 32 during the stapling operation. For example, by configuring the pivot pin 32 to directly engage the fiber reinforced polymer material of outer housing 26 via boss 26B1, the number of components within the hammer tacker 10 can be minimized which can ultimately further reduce the weight of the hammer tacker 10. Voids and crevices or cavities are defined so as to receive some components. For example, a cavity 26C is defined in the outer housing to receive the resilient member 33. In addition, an elongated channel cavity 26D extending through the handle portion 14 and into the head portion 12 is also defined within the outer housing 26 to receive the staple holder 38. The staple holder 38 is slidable against the channel 26D (formed of the fiber-reinforced polymer) of the outer housing 26 between the use position and the refill position.

Figure 3C:
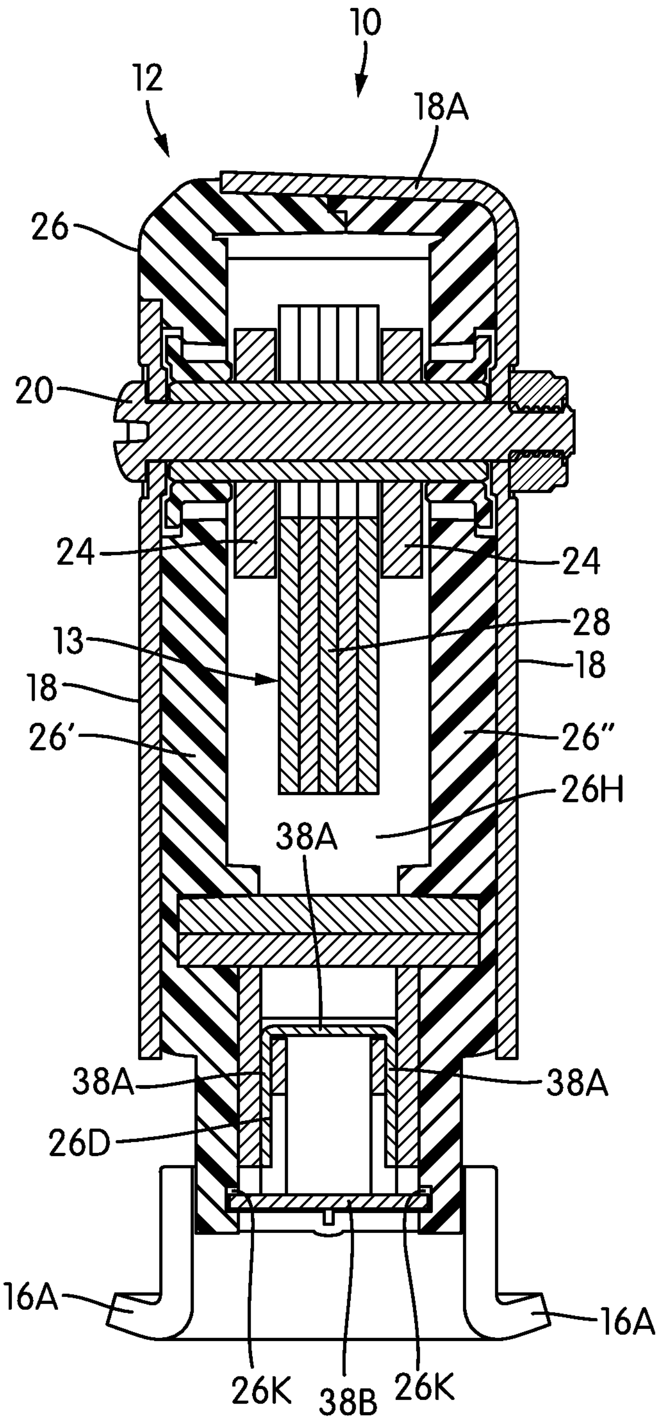
FIGS. 3C and 3D depict transverse cross-sectional internal views of the hammer tacker, according to an embodiment of the present disclosure.
Figure 3D:
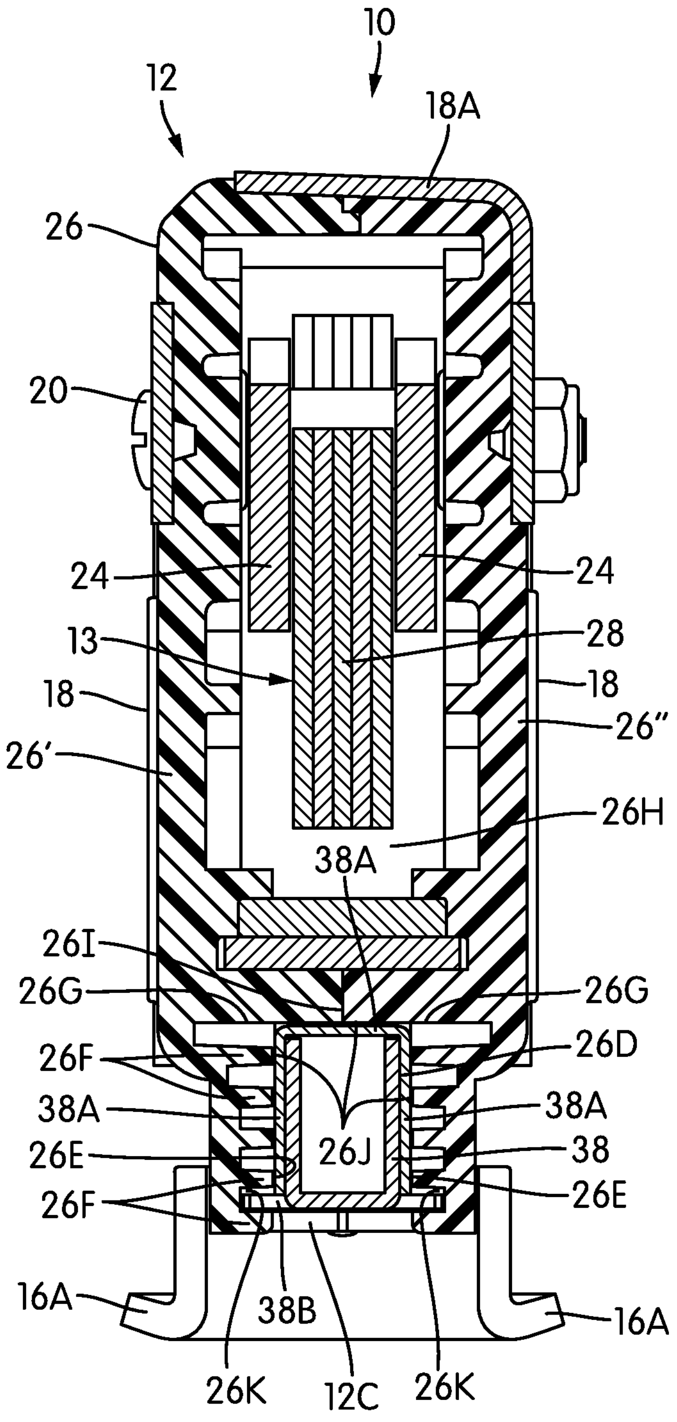

The half portion 26' of the outer housing 26 shown in FIG. 5 is joined to another half portion 26" to form the outer housing 26, as shown in FIGS. 3C and 3D. Therefore, the housing 26 is formed by at least two die-formed structures 26' and 26". In an embodiment, the die-formed structures 26' and 26" are injection molded. In an embodiment, the die-formed structures 26' and 26" that form the outer housing 26 are formed by injection molding of fiber reinforced polymer material.

In an embodiment, the channel 26D has a generally inverted u-shape configuration. The surfaces defining the inverted u-shape configuration will slidingly engage the outer surfaces of the inverted u-shaped staple pusher 38A, as shown most clearly in FIG. 3D. Opposite side surfaces 26E of the channel 26D are formed by the fiber reinforced polymer material of the housing 26. In FIG. 5, only one side surface 26E is shown as one half 26' of the housing 26 is depicted. As will be understood, the other side surface 26E of channel 26D is present in the opposite symmetrical half 26" of the housing 26. The side surfaces 26E of channel 26D comprise ribs 26F formed therein. The channel 26D also comprises an upper surface 26G formed by the fiber reinforced polymer material of the housing 26. In an embodiment, the side surfaces 26E together with the upper surface 26G define the generally inverted u-shaped channel surface 26J of the channel 26D in the fiber reinforced polymer of the housing 26. Half of the upper surface 26G is respectively provided by each of the molded housing halves 26' and 26", and meet at an interface 261. Thus, the channel 26D is defined by the generally inverted u-shaped channel surface 26J formed by the fiber reinforced polymer material of the housing 26. FIGS. 3C and 3D which are transverse cross-sections of the hammer tacker 10 taken at the head portion 12 show the position of the channel 26D and the inverted u-shaped channel surface 26J of the channel 26D. The staple holder 38, shown in FIGS. 3C and 3D as having a u-shaped transverse cross-section, slidingly contacts portions of the inverted u-shaped surface 26J formed by the fiber reinforced polymer material of the housing when moved between a use position and a refill position. A first of the die-formed structures 26' of the housing 26 (shown in FIG. 5) form one portion of the inverted u-shaped channel surface 26J and a second of the die-formed structures 26" form another portion of the inverted u-shaped channel surface 26J. Above the upper surface 26G of the channel 26D there is provided a cavity 26H formed by the die-formed structures 26' and 26". In an embodiment, at least a portion of the staple driver assembly 13 is positioned in the cavity 26H. For example, the activation arms 24 and the driver plate 28 are provided within the cavity 26H.

In an embodiment, the staple holder 38 has an outwardly extending flange 38B near a lower extremity of the staple holder 38. The outwardly extending flange 38B is configured to slide in slots, grooves or channels 26K provided in side surfaces 26E of channel 26D between two pairs of ribs 26F. The staple holder 38 slides against the ribs 26F of the side surfaces 26E of channel 26D. In an embodiment, the staple pusher 38A has generally a same cross-sectional shape as a staple and is configured to apply a forwardly directed force to a rearmost staple of the staple stick. The staple is guided by the u-shaped staple holder 38 as well as the upper surface 26G of the channel 26D and the ribs 26F in side surfaces 26E of the channel 26D.

In an embodiment, the outer housing 26 is made from a reinforced polymer such as a carbon fiber reinforced polymer or a glass fiber reinforced polymer. The use of a fiber reinforced polymer to make the outer housing 26 provides a reduction of the overall weight of the hammer tacker over conventional hammer tackers while providing the impact strength to withstand similar impact loads as steel parts in conventional hammer tackers.

In an embodiment, the fiber reinforced polymer material of the housing 26 comprises a carbon fiber reinforced polymer material. In one embodiment, the carbon reinforced polymer material comprises between approximately 10% and approximately 40% by volume of carbon fiber. In one embodiment, when the polymer used is nylon, the fiber reinforced polymer material comprises carbon fiber reinforced nylon. In one embodiment, the carbon reinforced nylon material comprises between approximately 15% and approximately 30% by volume of carbon fiber. In one embodiment, the carbon reinforced nylon material comprises 25% by volume of carbon fiber.

Table 1 provides a list of weights of various models of conventional hammer tackers and the weight of an embodiment of the present hammer tacker having a fiber reinforced polymer outer housing (in this instance a carbon fiber reinforced polymer).

TABLE 1

| | Manufacturer | Weight lb. | Weight kg. | CF % Lighter by . . . |
|---|---|---|---|---|
| PC2K | BOSTITCH | 2.19 | 1.00 | 34% |
| HTX50 | ARROW | 2.11 | 0.96 | 31% |
| Tomahawk | ARROW | 2.22 | 1.01 | 35% |
| PHT250X | STANLEY | 2.44 | 1.11 | 41% |
| DWHTHT450 | DeWALT | 2.3 | 1.05 | 37% |
| Milwaukee | MILWAUKEE | 2.6 | 1.18 | 44% |
| Carbon Fiber (CF) | STANLEY | 1.45 | 0.66 | |

The column "CF % Lighter by" provides approximately by how much in percentage the carbon fiber (CF) hammer tacker is lighter in comparison with the conventional hammer tacker models. This is calculated by the using the following equation (1).

$$CF\ \% = 100\% - \left(\frac{\text{Weight of } CF}{\text{Weight of Conventional Model}}\right) \times 100\% \quad (1)$$

Therefore, as shown in Table 1, the hammer tacker having the carbon fiber reinforced polymer outer housing is lighter than any of the conventional models by at least 30%, i.e., the hammer tacker having the fiber reinforced polymer has a weight that is at least 30% lesser than a weight of any conventional hammer tacker. The reduction in weight is achieved by providing a lighter outer housing 26 by using a lighter material (e.g., fiber reinforced polymer) without sacrificing any of the desired attributes in a hammer tacker which include, but not limited to, sturdiness, rigidity, high impact resistance, resilience, resistance to damage, etc. One benefit in reducing overall weight of the hammer tacker 10 is reducing fatigue for the user during operation. Furthermore, instead of providing various steel parts to hold various components inside the hammer tacker 10 only one outer housing 26 made of fiber reinforced polymer is used to accommodate various components of the hammer tacker without additional steel parts. Hence, by providing a single outer housing, the number of parts needed to construct the hammer tacker can be reduced which ultimately reduces the likelihood of breakage or malfunction. In fact, the present hammer tacker has an improved drop strength relative to comparable conventional hammer tackers.

In one embodiment, as shown in FIG. 1, the hammer tacker 10 has a length L measured from an extremity in the head portion 12, i.e., from the tip of lip 16A of the impact plate 16 to the an extremity of the handle portion 14, i.e., to the tip of cap 42 (shown in FIG. 4). In an embodiment the length L is between 10 inches and 16 inches. In an embodiment the length L is between 13.0 inches and 15.0 inches. In an embodiment, the length L is between 13.5 inches and 15.0 inches. In an embodiment, the length L is between 13.5 inches and 14.5 inches. In an embodiment, the length is approximately 14 inches.

In an embodiment, a total weight of the hammer tacker 10, with the staple holder devoid of staples, is less than 2.0 lbs. In an embodiment, the total weight is less than 1.8 lbs. In an embodiment, the total weight is less than 1.6 lbs. In an embodiment, the total weight is less than 1.5 lbs. In an embodiment, the total weight of the hammer tacker is between 1.3 lbs. and 1.9 lbs. In an embodiment, the total weight of the hammer tacker is between 1.4 lbs. and 1.5 lbs. In an embodiment, the total weight is approximately 1.45 lbs.

Therefore, a ratio of the total weight in lbs., with the staple holder devoid of staples, to length in inches of the hammer tacker can be calculated. In an embodiment, the ratio of total weight of the hammer tacker 10 to length L of the hammer tacker 10 is less than 0.13 lb/inch. In an embodiment, the ratio is less than 0.12 lb/inch. In an embodiment, the ratio is between 0.09 lb/inch and 0.12 lb/inch. In an embodiment, the ratio is between 0.09 lb/inch and 0.11 lb/inch. In an embodiment, the ratio is approximately 0.1 lb/inch.

As stated in the above paragraph, the staple holder 38 can carry about 176 staples. Therefore, a ratio of a total weight of the hammer tacker 10, with the hammer tacker devoid of staples divided by the maximum capacity of staples (in this case 176 stapes) can also be calculated. In an embodiment, the ratio of the total weight of the hammer tacker in lbs., with the staple holder devoid of staples, divided by the maximum capacity of staples (in this case 176 staples) is less than 0.012 lb/staple. In an embodiment, the ratio is between 0.006 lb/staple and 0.01 lb/staple. In an embodiment, the ratio is between 0.007 lb/staple and 0.009 lb/staple. In an embodiment, the ratio is between 0.008 lb/staple and 0.009 lb/staple. In an embodiment, the ratio is approximately 0.008 lb/staple. In an embodiment, the ratio is approximately 0.01 lb/staple.

Figure 6:
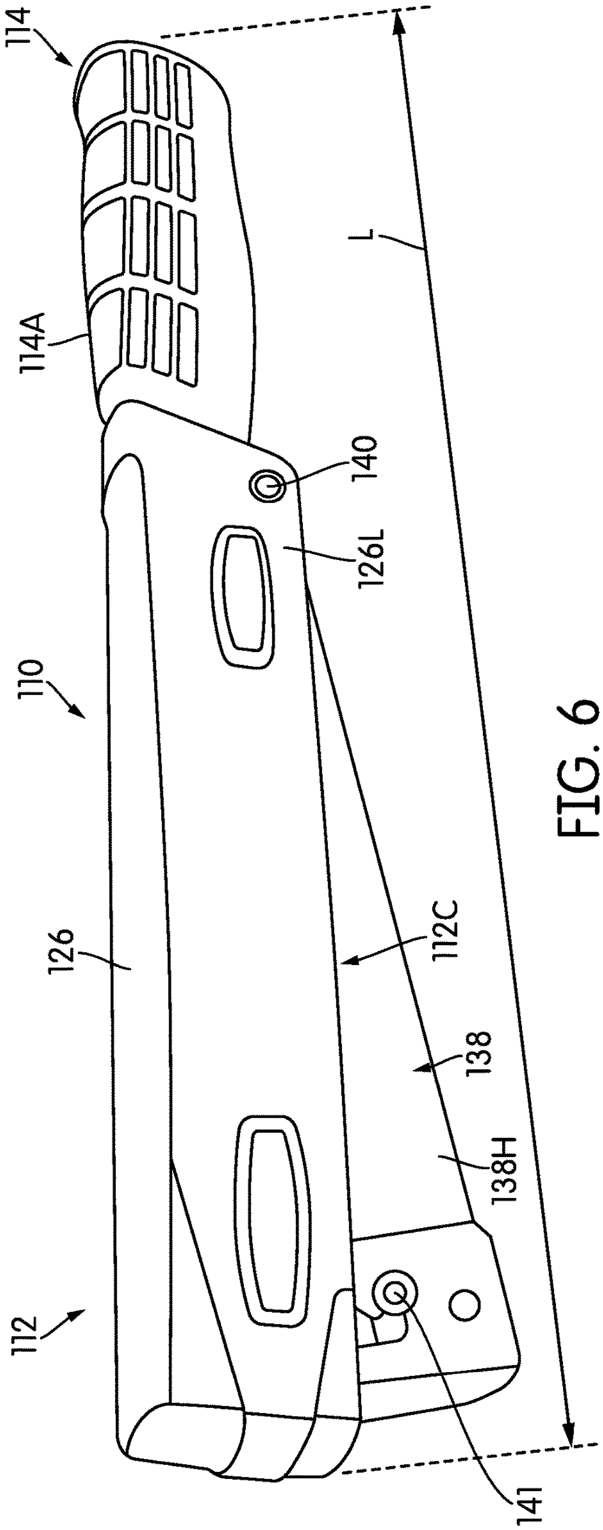
FIG. 6 depicts a perspective view of a hammer tacker, according to another embodiment of the present disclosure.

FIG. 6 depicts a perspective view of a hammer tacker, according to another embodiment of the present disclosure. The hammer tacker 110 includes a head portion 112 and a handle portion 114 connected to the head portion 112. The hammer tacker 110 further includes an outer housing or cover 126 that forms part of the head portion 112 and part of the handle portion 14. The outer housing 126 is substantially hollow, having a closed sleeve or tubular portion 114A at the handle portion 114, and having a cavity 112C at the head portion 112. In an embodiment, the outer housing 126 is constructed of carbon fiber reinforced polymer. In another embodiment, the outer housing 126 is constructed using glass fiber reinforced polymer. In an embodiment, the carbon reinforced polymer material comprises between approximately 10% and approximately 40% by volume of carbon fiber. In an embodiment, the polymer is nylon and the carbon reinforced polymer is a carbon fiber reinforced nylon material. In an embodiment, the carbon fiber reinforced nylon material comprises between approximately 15% and approximately 30% by volume of carbon fiber. In an embodiment, the carbon fiber reinforced nylon material comprises 25% by volume of carbon fiber. However, as it can be appreciated other strength reinforced polymers can be used.

Figure 7:
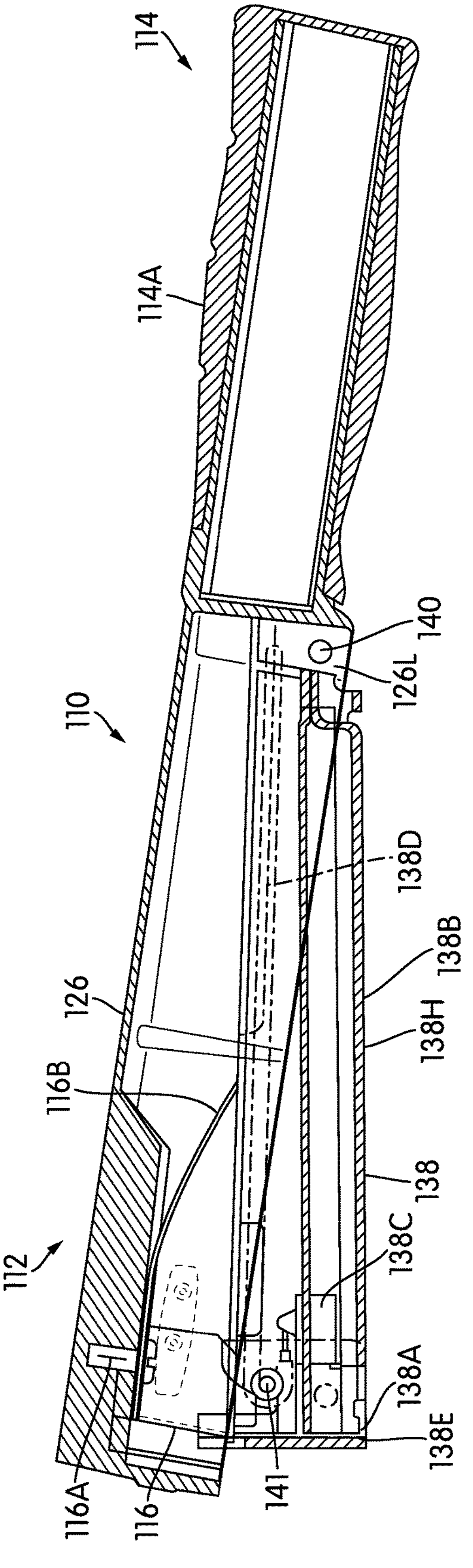
FIG. 7 depicts a transverse internal view of the hammer tacker shown in FIG. 6, according to an embodiment of the present disclosure.
Figure 8:
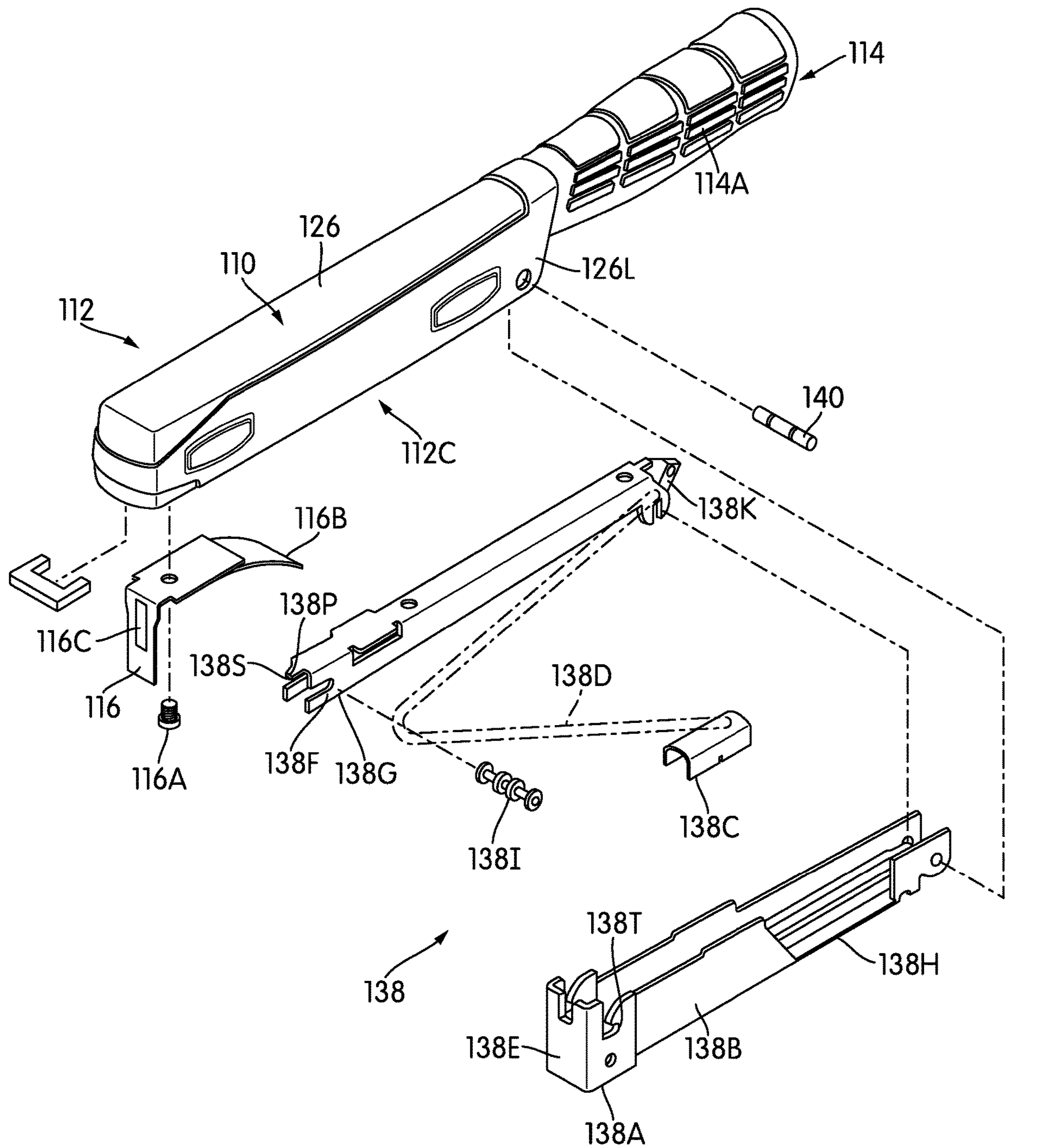
FIG. 8 depicts an exploded view the hammer tacker shown in FIG. 6, showing various internal parts of the hammer tacker, according to an embodiment of the present disclosure.

FIG. 7 depicts a transverse internal view of the hammer tacker 110 shown in FIG. 6, according to an embodiment of the present disclosure. FIG. 8 depicts an exploded view the hammer tacker showing various internal parts of the hammer tacker 110, according to an embodiment of the present disclosure. The hammer tacker 110 further includes an elongated staple holder 138. The elongated staple holder 138 is pivotally mounted to the housing 126 via connector (e.g., pin) 140. The elongated staple holder 138 comprises a housing 138H. In an embodiment, the housing 138H of the elongated staple holder 138 can be made from various materials including metal (e.g., steel, aluminum, etc.) or made from a fiber reinforced polymer such as a carbon reinforced polymer or a glass reinforced polymer. Similar to the housing or cover 126, in an embodiment, the elongated staple holder 138 can also be made of carbon reinforced polymer material. In an embodiment, the carbon reinforced polymer comprises between approximately 10% and approximately 40% by volume of carbon fiber. In an embodiment, the polymer is nylon and the carbon reinforced polymer is a carbon fiber reinforced nylon material. In an embodiment, the carbon fiber reinforced nylon material comprises between approximately 15% and approximately 30% by volume of carbon fiber. In an embodiment, the carbon fiber reinforced nylon material comprises 25% by volume of carbon fiber.

As also shown in FIGS. 7 and 8, the elongated staple holder 138 is pivotally mounted to the housing 126 via the connector (e.g., pin) 140. The connector (e.g., pin) 140 links the elongated staple holder 138 to each lateral side 126L of the housing 126. The connector (e.g., pin) 140 can be made from any suitable material including metal (e.g., steel, aluminum, etc.).

The elongated staple holder 138 is configured to receive one or more staple sticks. In one embodiment, one staple stick contains 82 or alternately 84 staples. A staple pusher 138C is provided within the housing 138H of the elongated staple holder 138 to push the staples in the one or more staple sticks toward an opening 138A provided at the bottom of the end 138B of the housing 138H of the elongated staple holder 138 at a front end 138E of the elongated staple holder 138 so as to allow a staple (not shown) to exit the elongated staple holder 138 when the hammer tacker 110 is actuated. In an embodiment, the elongated staple holder 138 is configured to carry two sticks of staples. Therefore, in one embodiment, the elongated staple holder 138 is configured to carry 164 or alternately 168 staples. It should be appreciated, however, that in another embodiment, the entire hammer tacker 110 (and elongated staple holder 138) may be configured to hold only a single stick of staples. In that case, the entire size and weight of the hammer tacker 110 can be made smaller. In one embodiment, the hammer tacker 110 can be made proportionally smaller. In one embodiment, the hammer tacker 110 can also be made proportionally lighter. It should also be appreciated that the number of staples per staple stick can be more or less than 82 or 84 staples, without departure from the principles set forth herein. In one embodiment, the hammer tacker 110 can accommodate three or more staple sticks.

In one embodiment, as shown in FIG. 6, the hammer tacker 110 has a length L measured from an extremity in the head portion 112 to an extremity of the handle portion 114. In an embodiment the length L is between 11 inches and 14 inches. In an embodiment, the length L is between 11.0 inches and 13.0 inches. In an embodiment, the length L is between 11.5 inches and 12.5 inches. In an embodiment, the length is approximately 12 inches.

In an embodiment, a total weight of the hammer tacker 110, with the staple holder devoid of staples, is less than 2.0 lbs. In an embodiment, the total weight is less than 1.5 lbs. In an embodiment, the total weight is less than 1.2 lbs. In an embodiment, the total weight of the hammer tacker is between 0.8 lbs. and 1.2 lbs. In an embodiment, the total weight of the hammer tacker is between 1.0 lb. and 1.1 lbs. In an embodiment, the total weight is approximately 1 lb.

Therefore, a ratio of the total weight in lbs. (with the staple holder devoid of staples) to length in inches of the hammer tacker can be calculated. In an embodiment, the ratio of total weight of the hammer tacker 110 to length L of the hammer tacker 110 is less than 0.13 lb/inch. In an embodiment, the ratio is less than 0.12 lb/inch. In an embodiment, the ratio is between 0.06 lb/inch and 0.12 lb/inch. In an embodiment, the ratio is between 0.07 lb/inch and 0.10 lb/inch. In an embodiment, the ratio is approximately 0.08 lb/inch. In an embodiment, the ratio is approximately 0.1 lb/inch.

As stated in the above paragraph, the staple holder 138 can carry about 164 to 168 staples. Therefore, a ratio of a total weight of the hammer tacker 110 (with the hammer tacker 110 devoid of staples) divided by the maximum capacity of staples (in this case about 164 staples) can also be calculated. In an embodiment, the ratio of the total weight of the hammer tacker in lbs., with the staple holder devoid of staples, divided by the maximum capacity of staples (about 164 to 168 staples) is less than 0.012 lb/staple. In an embodiment, the ratio is between 0.004 lb/staple and 0.012 lb/staple. In an embodiment, the ratio is between 0.004 lb/staple and 0.012 lb/staple. In an embodiment, the ratio is between 0.005 lb/staple and 0.008 lb/staple. In an embodiment, the ratio is approximately 0.006 lb/staple.

The hammer tacker 110 comprises an impact plate 116. The impact plate 116 is held inside the cavity 112C of the outer housing 126 in the head portion 112 using a fastener 116A. A biasing member (e.g., a spring such as a spring plate) 116B is also provided to bias the elongated staple holder 138 away from the outer housing 126. In an embodiment, the impact plate 116 can be made of metal such as, for example, steel, iron, aluminum, etc. The staple pusher 138C is configured to slide on a surface of the housing 138H of the elongated staple holder 138 to push on staples towards the impact plate 116.

Figure 12A:
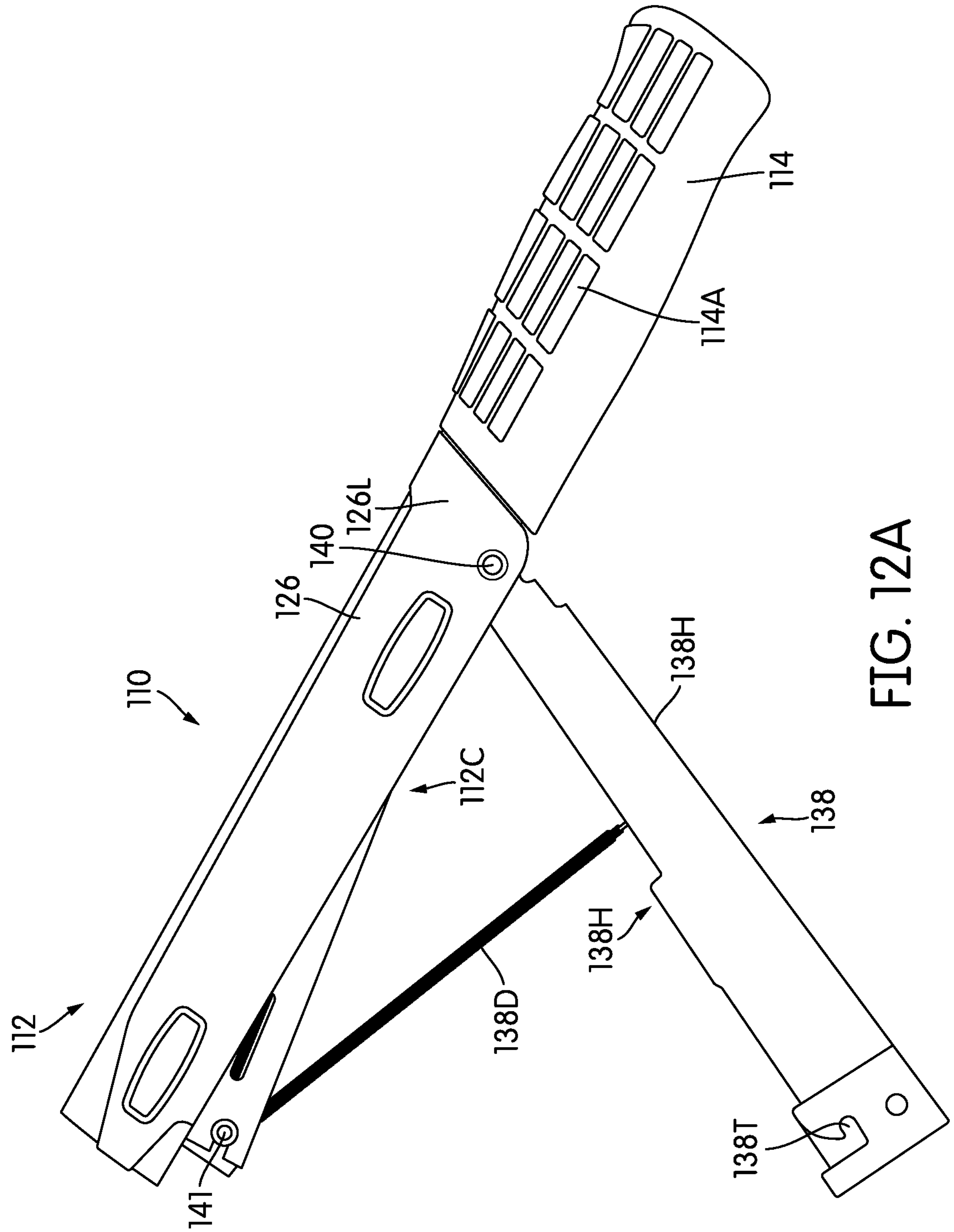
FIG. 12A is a perspective view of the hammer tacker shown in FIG. 6 in a refill position wherein the staple holder is pivoted away from the housing of the hammer tacker to load staples into the hammer tacker, according to an embodiment of the present disclosure.
Figure 12B:
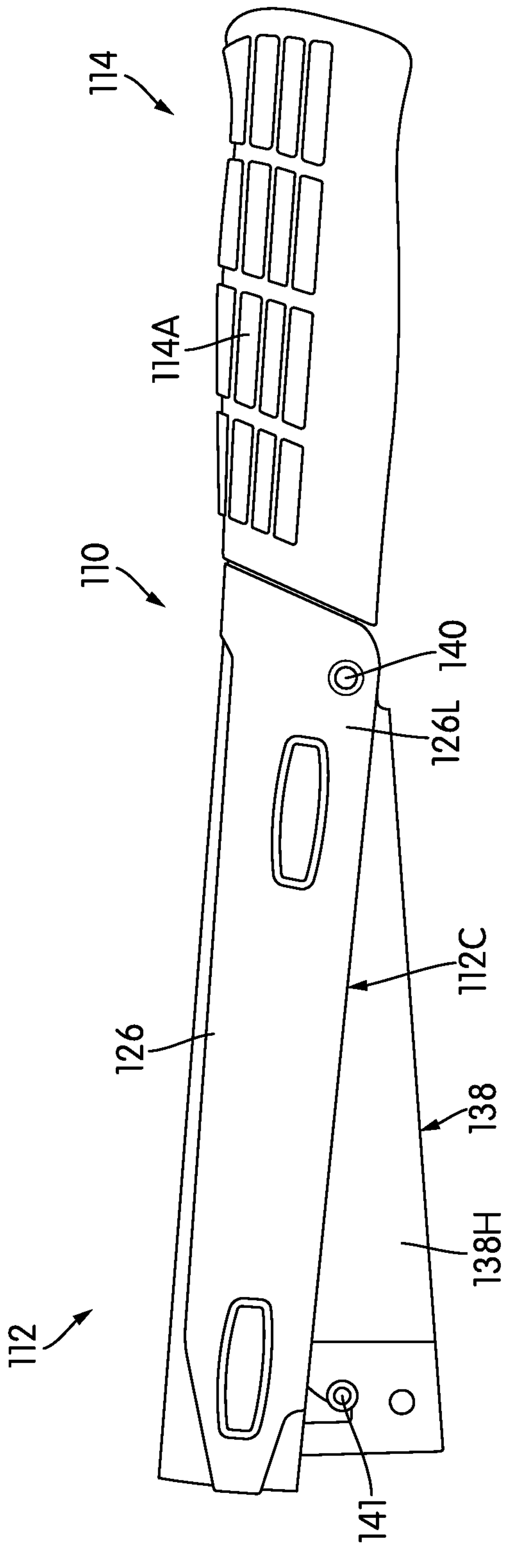
FIG. 12B is a perspective view of the hammer tacker shown in FIG. 6 in a use position wherein the staple holder is pivoted towards the housing, according to an embodiment of the present disclosure.

The elongated staple holder 138 is pivotable around connector (e.g.,) pin) 140 between a use position and a refill position, as shown in FIGS. 12A and 12B. In the release position, as shown in FIG. 12A, the staple holder 138 is pivoted away from the housing 126 and staples (e.g., a stick of staple) can be loaded into the housing 138H of the elongated staple holder 138. In the use position, as shown in FIG. 12B, the elongated staple holder 138 is pivoted towards the housing 126 and the staple pusher 138C slides on the elongated staple holder 138 to push the staples towards the impact plate 116.

The elongated staple holder 138 includes a guide track member 138F pivotally linked to the outer housing 126 via the connector (e.g., pin) 140. The elongated staple holder 138 further includes an elongated resilient member 138D that is configured and arranged to bias the staple pusher 138C to push on the staples towards the strike or impact plate 116. The elongated resilient member 138D is attached on one end 138K to an extremity of the guide track member 138F and on the opposite end to the staple pusher 138C. The elongated resilient member 138D is guided by a pin 138I arranged through a slot 138S at an extremity 138G of the guide track member 138F. The guide track member 138 has a protruding projection 138P provided at extremity 138G. The protruding projection 138P of the guide track member 138F is configured to fit through an opening 116C in impact plate 116 to lock in the guide track member 138F inside the cavity 112C and prevent the guide track from extending outside of the cavity 112C under the biasing force of the resilient member (e.g., a spring such as a spring plate) 116B.

In an embodiment, the staple pusher 138C is made of metal (such as, for example, steel, iron, aluminum, etc.). However, the staple pusher 138 can also be made of a fiber reinforced polymer (such as, for example, carbon fiber reinforced polymer, etc.). In an embodiment, in order to fill or refill the elongated staple holder 138 with staples, a lock mechanism 141 that connects the elongated staple holder 138 to the housing 126 is unlocked and the elongated staple holder 138 is then pivoted relative to the housing 126 to open the hammer tacker 110 to provide access to a cavity within the housing 138H of the elongated staple holder 138. In one embodiment, the lock mechanism 141 includes the pin 138I. The pin 138I is moveable within the slot 138S to engage or disengage an edge or notch 138T provided at a front end or extremity 138E of the elongated staple holder 138.

During the opening operation, the lock mechanism 141 is unlocked by pulling the pin 138I away from the notch 138T to disengage the pin 138I from the notch 138T to allow the elongated staple holder 138 to pivot away from the housing 126. While the elongated staple holder 138 pivots, the staple pusher retracts back under the pulling action of the resilient member 138D. One or more sticks of staples can then be placed inside the cavity 138H. During the closing operation, the elongated staple holder 138 is pivoted back towards the housing 126 and the staple pusher 138C slides forward towards the front end 138E to push the staples towards the strike plate 116. During the closing operation, the lock mechanism 141 locks the elongated staple holder 138 (the pin 138I engages the edge or notch 138T of the elongated staple holder 138) so as to prevent the elongated staple holder 138 from decoupling from the housing 126 during operation of the hammer tacker 110.

In operation, when the hammer tacker 110 is actuated and swung against a workpiece (e.g., wood), the front end 138E of the elongated staple holder 138 comes in contact with the workpiece (not shown). Under the strike force, the elongated staple holder 138 rotates around the connector (e.g., pin) 140 and the front end 138E moves upwardly. As a result, the impact plate 116, which is fixed to the housing 126, moves downwardly in the opposite direction relative to the elongated staple holder 138 to strike the staple (not shown) and drive the staple through the opening 138A into the workpiece or object. Once, the staple is driven into the workpiece, the biasing member (e.g., spring) 116B applies a force to the elongated staple holder 138 to push the elongated staple holder away from the outer housing 126. As a result, the impact plate 116 retracts back and the staple stick moves forward towards the opening 138A ready for the next strike.

Although the present patent application has been described in detail for the purpose of illustration based on what is currently considered to be the most practical and preferred embodiments, it is to be understood that such detail is solely for that purpose and that the present patent application is not limited to the disclosed embodiments, but, on the contrary, is intended to cover modifications and equivalent arrangements that are within the spirit and scope of the appended claims. For example, it is to be understood that the present patent application contemplates that, to the extent possible, one or more features of any embodiment can be combined with one or more features of any other embodiment.

It should be appreciated that in one embodiment, the drawings herein are drawn to scale (e.g., in correct proportion). However, it should also be appreciated that other proportions of parts may be employed in other embodiments.

Furthermore, since numerous modifications and changes will readily occur to those of skill in the art, it is not desired to limit the present patent application to the exact construction and operation described herein. Accordingly, all suitable modifications and equivalents should be considered as falling within the spirit and scope of the present patent application.

What is claimed:

1. A hammer tacker comprising:

a housing, the housing is formed from a fiber reinforced polymer material;

a staple holder comprising an elongated body configured to extend along a length of the housing, the staple holder being movable between an operative position secured within the housing, and a refill position wherein the staple holder extends outwardly from the housing;

the staple holder constructed and arranged to receive at least three staple sticks therein, and a latch operatively connected to the staple holder, wherein the latch comprises a pivotable press member that is movable about a pivot axis between a lock position wherein the pivotable press member is configured to lock against the housing and secure the staple holder in the operative position, and a release position wherein the pivotable press member is released from the housing to enable the staple holder to move to the refill position, the pivotable press member being resiliently biased towards the lock position, wherein the pivotable press member including the pivot axis thereof is slidably mounted to the elongated body for linear movement relative to each other to move the elongated body from a normal position to a jam release position, wherein the elongated body is biased towards the normal position and movable against such bias to the jam release position while the staple holder remains secured in the operative position within the housing;

wherein the elongated body has a rearward portion thereof extending in longitudinally overlapping relation with a rearward portion of the pivotable press member, such that pivotal movement of the pivotable press member towards the rearward portion of the elongated body causes the pivotable press member to be moved from the lock position to the release position.

2. The hammer tacker according to claim 1, wherein the pivotable press member is biased towards the lock position by a spring, and wherein the spring further biases the elongated body towards the normal position.

3. The hammer tacker according to claim 1, wherein the pivot axis comprises a pin member.

4. The hammer tacker according to claim 3, wherein the pin member passes through a slot provided in the elongated body.

5. The hammer tacker according to claim 4, wherein the slot is configured to allow longitudinal movement of the elongated body relative to the pin member.

6. The hammer tacker according to claim 1, wherein the staple holder is formed from a fiber reinforced polymer material.

7. The hammer tacker according to claim 1, wherein the staple holder is formed from a metal material.

* * * * *